(12) United States Patent
Singh

(10) Patent No.: US 9,789,462 B2
(45) Date of Patent: Oct. 17, 2017

(54) APPARATUSES AND METHODS FOR ACCURATE STRUCTURE MARKING AND MARKING-ASSISTED STRUCTURE LOCATING

(71) Applicant: The Boeing Company, Seal Beach, CA (US)

(72) Inventor: Navrit Pal Singh, Renton, WA (US)

(73) Assignee: The Boeing Company, Chicago, IL (US)

( * ) Notice: Subject to any disclaimer, the term of this patent is extended or adjusted under 35 U.S.C. 154(b) by 315 days.

(21) Appl. No.: 13/925,865

(22) Filed: Jun. 25, 2013

(65) Prior Publication Data
US 2014/0375794 A1 Dec. 25, 2014

(51) Int. Cl.
*B01J 19/12* (2006.01)
*B23K 26/082* (2014.01)
(Continued)

(52) U.S. Cl.
CPC ......... *B01J 19/121* (2013.01); *B23K 26/0626* (2013.01); *B23K 26/082* (2015.10);
(Continued)

(58) Field of Classification Search
CPC ........ B01J 19/121; G01B 11/24; G01B 11/14; G06T 7/0004
(Continued)

(56) References Cited

U.S. PATENT DOCUMENTS 4,953,933 A 9/1990 Asmar
4,970,600 A 11/1990 Garnier et al.
(Continued)

FOREIGN PATENT DOCUMENTS

JP H10328871 A 12/1998
JP 2002316276 A 10/2002
(Continued)

OTHER PUBLICATIONS

Extended European Search Report for EP 14171272.9-1702, Jan. 13, 2015, 9 pages (including English abstracts of JP2002-316276 and JP2005-262311).
(Continued)

*Primary Examiner* — Jay Patel
*Assistant Examiner* — Marnie Matt
(74) *Attorney, Agent, or Firm* — Womble Carlyle Sandridge & Rice LLP

(57) ABSTRACT

Working equipment includes a tool configured to work a structure at a working location thereon, with the structure having an applied marking at a known location with a known relationship with the working location. A computer system is configured to determine placement of the structure, and accordingly position the tool into at least partial alignment with the working location, and which in at least one instance, the tool is aligned with a second, offset location. A camera is configured to capture an image of the structure and including the marking, and further including the second location with which the tool is aligned. And the computer system is configured to process the image to locate the working location, reposition the tool from the second location and into greater alignment with the located working location, and control the repositioned tool to work the structure at the located working location.

20 Claims, 17 Drawing Sheets

(51) Int. Cl.
| | |
|---|---|
| *B23K 26/06* | (2014.01) |
| *G01B 11/14* | (2006.01) |
| *G01B 11/24* | (2006.01) |
| *G01C 3/08* | (2006.01) |
| *G05B 19/4093* | (2006.01) |
| *G06T 7/00* | (2017.01) |

(52) U.S. Cl.
CPC .............. *G01B 11/14* (2013.01); *G01B 11/24* (2013.01); *G01C 3/08* (2013.01); *G05B 19/40937* (2013.01); *G06T 7/0004* (2013.01); *G05B 2219/32025* (2013.01); *G05B 2219/45134* (2013.01); *Y02P 90/265* (2015.11)

(58) Field of Classification Search
USPC .......................................................... 348/95
See application file for complete search history.

(56) References Cited

U.S. PATENT DOCUMENTS

| | | | |
|---|---|---|---|
| 5,218,199 A | 6/1993 | Miller | |
| 5,380,978 A * | 1/1995 | Pryor | B23K 26/032 |
| | | | 219/121.64 |
| 5,471,541 A * | 11/1995 | Burtnyk | G06T 7/75 |
| | | | 356/604 |
| 5,653,900 A * | 8/1997 | Clement | B23K 26/0838 |
| | | | 219/121.68 |
| 5,771,138 A | 6/1998 | Zarouri et al. | |
| 5,903,459 A | 5/1999 | Greenwood et al. | |
| 6,317,616 B1 * | 11/2001 | Glossop | A61B 90/10 |
| | | | 600/407 |
| 6,330,356 B1 * | 12/2001 | Sundareswaran | G06T 3/00 |
| | | | 345/648 |
| 6,487,460 B1 * | 11/2002 | Haeno | G05B 19/4097 |
| | | | 219/121.6 |
| 6,819,974 B1 | 11/2004 | Coleman et al. | |
| 6,909,517 B2 | 6/2005 | Coleman et al. | |
| 7,277,811 B1 * | 10/2007 | Marsh | B23Q 17/22 |
| | | | 702/105 |
| 7,593,117 B2 | 9/2009 | Bennison et al. | |
| 7,743,660 B2 | 6/2010 | Marsh et al. | |
| 7,780,070 B2 | 8/2010 | Salour et al. | |
| 7,965,396 B2 | 6/2011 | Ashford et al. | |
| 8,168,917 B2 * | 5/2012 | Blakeley | G06K 1/126 |
| | | | 219/121.6 |
| 8,237,934 B1 * | 8/2012 | Cooke | G01S 17/66 |
| | | | 356/614 |
| 8,358,333 B2 | 1/2013 | Ashford | |
| 2002/0001082 A1 * | 1/2002 | Akimoto | G03F 7/70241 |
| | | | 356/400 |
| 2002/0076134 A1 | 6/2002 | Singh | |
| 2002/0119332 A1 | 8/2002 | Singh et al. | |
| 2003/0053054 A1 | 3/2003 | Li et al. | |
| 2003/0053055 A1 | 3/2003 | Li et al. | |
| 2003/0063292 A1 * | 4/2003 | Mostafavi | G06T 7/73 |
| | | | 356/614 |
| 2004/0035277 A1 * | 2/2004 | Hubbs | B25D 5/02 |
| | | | 83/682 |
| 2004/0182023 A1 * | 9/2004 | Chambers | E04B 2/702 |
| | | | 52/233 |
| 2005/0131571 A1 * | 6/2005 | Costin | G06Q 30/0601 |
| | | | 700/132 |
| 2006/0104734 A1 * | 5/2006 | Mathis | B23B 39/04 |
| | | | 408/236 |
| 2007/0278192 A1 * | 12/2007 | Blakeley | G06K 1/126 |
| | | | 219/121.6 |
| 2008/0144045 A1 * | 6/2008 | Bennison | G01B 21/20 |
| | | | 356/614 |
| 2008/0289163 A1 | 11/2008 | Piasse et al. | |
| 2008/0307886 A1 * | 12/2008 | Marsh | G01N 29/223 |
| | | | 73/601 |
| 2010/0078468 A1 | 4/2010 | Wheeler et al. | |
| 2010/0155380 A1 * | 6/2010 | Blackall | G06K 1/04 |
| | | | 219/121.69 |
| 2010/0233373 A1 | 9/2010 | Swanberg et al. | |
| 2011/0134225 A1 * | 6/2011 | Saint-Pierre | G01B 11/03 |
| | | | 348/47 |
| 2012/0133584 A1 * | 5/2012 | Lee | G06F 3/038 |
| | | | 345/158 |
| 2013/0016184 A1 * | 1/2013 | Gabel | G06T 19/00 |
| | | | 348/46 |
| 2013/0128284 A1 * | 5/2013 | Steffey | G01B 11/002 |
| | | | 356/623 |
| 2013/0137468 A1 * | 5/2013 | Kahle | G01C 15/00 |
| | | | 455/457 |

FOREIGN PATENT DOCUMENTS

| | | | | |
|---|---|---|---|---|
| JP | 2005262311 A | | 9/2005 | |
| JP | 2010142820 A | | 7/2010 | |
| KR | WO 2004011876 A1 * | | 2/2004 | ............. G01B 11/25 |
| WO | WO 2004011876 A1 * | | 2/2004 | ............. G01B 11/25 |

OTHER PUBLICATIONS

"Robotic Accuracy Improves Aerospace Manufacturing," FANUC Robotics America Corporation, copyright 2013—3 pages.
"3-Axis Laser Scanning Systems," Galvos from Cambridge Technology, copyright 2011—3 pages.
"Advantages of Laser Marking," Sintec Optronics Pte Ltd, 2 pages, retrieved on Jun. 14, 2013 from http://www.sintecoptronics.com/ref/AdvantageOfLaserMarking.pdf.
"Micro Motion Absolute™: Overview," MicroE Systems, copyright 2013, 2 pages.
"ATOS—Industrial 3D Scanning Technology," GOM Optical Measuring Techniques, 2 pages, retrieved on Jun. 14, 2013 from http://www.gom.com/metrology-systems/3d-scanner.html.
"G1400 High Performance Transmissive Rotary Encoder System," MicroE Systems, copyright 2013, 2 pages.
Laserinterferometric Vibrometer, SIOS Messtechnik GmbH, copyright 2005, 2 pages.
"OMC Technical Brief—Laser Tracker," Optical Metrology Centre, copyright 2001, 2 pages.
"Rotary encoder," Wikipedia article—http://en.wikipedia.org/wiki/Rotary_encoder[May 8, 2013 12:05:53 PM]—9 pages.
"Laser scanning," Wikipedia article—http://en.wikipedia.org/wiki/Laser_scanning[May 7, 2013 4:54:55 PM]—4 pages.
"InDot Integrated Dot Peen Marking Series," Pryor Marking Technology, copyright 2010, 4 pages.
"Fiducial marker," Wikipedia article—http://en.wikipedia.org/wiki/Fiduciary_marker[Apr. 25, 2013 8:37:44 AM]—4 pages.
"Laser engraving," Wikipedia article—http://en.wikipedia.org/wiki/Laser_engraving[Apr. 25, 2013 8:29:28 AM]—8 pages.
Examination Report dated Jan. 22, 2016 for Application No. 14 171 272.9.
European Examination Report for Application No. 14 171 272.9 dated Oct. 19, 2016.
Canadian Examination Report for Application No. 2,851,493 dated Oct. 20, 2016.
Canadian Examination Report dated Apr. 8, 2016 for Application No. 2,851,493.
Chinese Office Action issued Jan. 3, 2017 in Chinese Patent Application No. 201410291210.0 filed Jun. 25, 2013.

* cited by examiner

APPARATUSES AND METHODS FOR ACCURATE STRUCTURE MARKING AND MARKING-ASSISTED STRUCTURE LOCATING

TECHNOLOGICAL FIELD

The present disclosure relates generally to manufacturing a product and, in particular, to manufacturing a product using markings applied thereto.

BACKGROUND

The accuracy with which automated manufacturing equipment is able to work parts depends largely on the quality of the location and orientation information used with the equipment. For example, with poor location and/or orientation information about a part, the most state of the art manufacturing equipment will only be able to work the part in a marginal manner. Conversely, with precise location and orientation information, a marginal piece of equipment may be able to perform well.

Automated manufacturing processes requiring a moderate amount of accuracy do not call for particular part location and orientation information beyond knowing that the part has been positioned in a standard place. For these processes, the accuracy of standard part positioning allows part working with sufficient accuracy. In these processes, for example, a part to be worked can be placed in a standard location in or near the applicable automated machine, for example by abutting a predetermined edge of the part with a predetermined edge of a work platform and the machine can be programmed to work the part in that standard location. In processes requiring only moderate accuracy, standard part placement and machine operation are precise enough to achieve desired results.

Automated manufacturing processes requiring a high level of accuracy call for part locating and/or orienting after the part has been positioned. Some processes require automated machinery to work parts with a very high degree of accuracy. For example, very high accuracy is required where interchangeable hole patterns are being used. Interchangeable hole patterns are those made in product parts likely to be interchanged during the life of the product. For example, while most other parts of aircraft may not require changing, it may be determined that a particular door typically requires replacement at least once during the life of the aircraft. In this example, the mating characteristics of the door and the door mounting location of the plane must lie within tighter than standard tolerances.

Although parts of aircraft are generally manufactured at or about the same time and often in the same plant, an aircraft and a replacement part therefor may be manufactured at different plants and far apart in time. For example, an aircraft manufacturer may outsource replacement part manufacture to a supplier. Although various manufacturing inaccuracies in a process repeatedly performed in the same place and time may cancel each other out or aggregate within acceptable limits, a part made decades later at a different location is less likely to have these benefits. For example, manufacturing inaccuracies in formation of a first part are more likely to have inaccuracies that correspond to complimentary inaccuracies made in a second part on the same machine on the same day.

Although many part locating and orienting processes are adequate, it is generally desirable to have an improved system and method that takes into account at least some of the issues discussed above, as well as possibly other issues.

BRIEF SUMMARY

Example implementations of the present disclosure are generally directed to a laser-marking system, working equipment and related methods for marking-assisted structure locating. In conventional machining, a structure may be brought to working equipment to work the structure. As structures grow in size, working equipment are instead more often being brought to the structure to work the structure in a selected zone or working envelope. In a fully-automated and flexible manufacturing environment, example implementations of the present disclosure may enable working equipment to align their coordinate system to that of the structure to be worked by looking at one or more markings applied to the structure (e.g., large-size structure).

According to one aspect of example implementations, the laser-marking system includes a laser source configured to emit a laser beam, and a steering assembly configured to steer the laser beam onto a structure to be worked. The laser-marking system also includes a computer system coupled to the laser source and steering assembly. The computer system is configured to direct operation of the laser source to emit the laser beam with one or more controllable parameters to apply a permanent marking to the structure. The computer system is also configured to direct operation of the steering assembly to steer the laser beam to a known location on the structure at which to apply the marking, with the respective location having a known relationship with a working location at which to work the structure.

In one example, the steering assembly may include a galvanometer coupled to a mirror configured to reflect the laser beam. The galvanometer and mirror may be controllably rotatable to steer the laser beam in a particular direction. And the steering assembly may include an optical rotary encoder coupled to the computer system and galvanometer, and configured to measure an angular position of the galvanometer. In this regard, the computer system may be configured to determine a location of the laser beam on the structure based on the measurement, and steer the laser beam to the known location based on the determined location.

In one example, the laser-marking system may further include a (first) camera coupled to the computer system and configured to capture an image of at least a portion of the structure and including one or more targets on or proximate the structure. Or the laser-marking system may include a laser scanner configured to measure points on a surface of the structure from which a 3D model of the structure is generatable. In this example, the computer system may be configured to process the image or 3D model to determine placement of the structure, and locate the known location at which to apply the marking based on the structure's placement.

In one example, the known location may be a desired location, and in at least one instance the marking may be offset from the desired location. In this example, the laser-marking system may further include a (second) camera coupled to the computer system and configured to capture an image of at least a portion of the structure and including the desired location and marking. The computer system may be configured to process the image to locate the desired location, and determine an offset of the marking from the located desired location.

In a further example, the (second) camera may have a field of view steerable by the steering assembly, and the computer system may be configured to direct operation of the steering assembly to steer the field of view to one or more areas within which one or more targets on or proximate the structure are located. For the area(s), the (second) camera may be configured to capture one or more images of at least a portion of the structure and including the target(s). And the computer system may be configured to process the image(s) to determine placement of the structure, and locate the known location at which to apply the marking based on the structure's placement.

In one example, the laser-marking system may further include a second laser source configured to project a laser image on the structure at the location before the laser beam is emitted to apply the permanent marking to the structure at the respective location.

In some examples, the laser-marking system may further include one or more metrology systems coupled to the computer system, and include one or more of a laser tracker, range sensor or vibration sensor. The laser tracker may be configured to project one or more steerable laser beams onto retro-reflective targets on or proximate the structure at known locations, and provide measurements of reflected one or more beams from the targets for determination of placement of the structure. The range sensor may be configured to provide range measurements between the laser-marking system and structure for calculation of an initial focus point or focal length for operation of the laser source, or dynamic adjustment of the focal length. The vibration sensor may be configured to provide measurements of vibration of the structure, or the laser-marking system including the vibration sensor disposed thereon, for compensation of vibrational movement of the structure or laser-marking system.

According to another aspect of example implementations, the working equipment includes a tool configured to work a structure at a working location thereon, with the structure having a marking applied thereto at a known location with a known relationship with the working location. The working equipment may include a computer system coupled to the tool and configured to determine placement of the structure, and position the tool into at least partial alignment with the working location according to the structure's placement. In at least one instance, the tool may be aligned with a second location offset from the working location. The working equipment may further include a (second) camera coupled of the computer system and configured to capture an (second) image of at least a portion of the structure and including the marking, and further including the second location with which the tool is aligned. The computer system, then, may be configured to process the image to locate the working location, reposition the tool from the second location and into greater alignment with the located working location, and control the repositioned tool to work the structure at the located working location.

In one example, the camera is a second camera configured to capture a second image. In this example, the working equipment may further include a first camera coupled to the computer system and configured to capture a first image of at least a portion of the structure and including one or more targets on or proximate the structure. The computer system, then, may be configured to process the first image to thereby determine the structure's placement.

In one example, the working equipment may further include a movable end effector assembly coupled to the computer system, and including an end effector and the tool. In this example, the camera may be secured to the end effector assembly. Also in this example, the computer system may be configured to position the end effector assembly and thereby the tool, with the camera also being thereby positioned such that a field of view of the camera encompasses the marking.

In one example, the (second) camera has a field of view divided into a plurality of concentric zones of increasing size about the second location with which the tool is aligned. In this example, the zones include a first zone that defines an acceptable offset, and a larger second zone located outside the first zone that defines an unacceptable offset. Also in this example, the computer system may be configured to control the tool to work the structure without repositioning in an instance in which the located working location is within the first zone, or reposition the tool before controlling the tool to work the structure in an instance in which the located working location is within the second zone.

In other aspects of example implementations, methods are provided for application of a marking to a structure, and locating the structure or locations thereon based on the marking. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
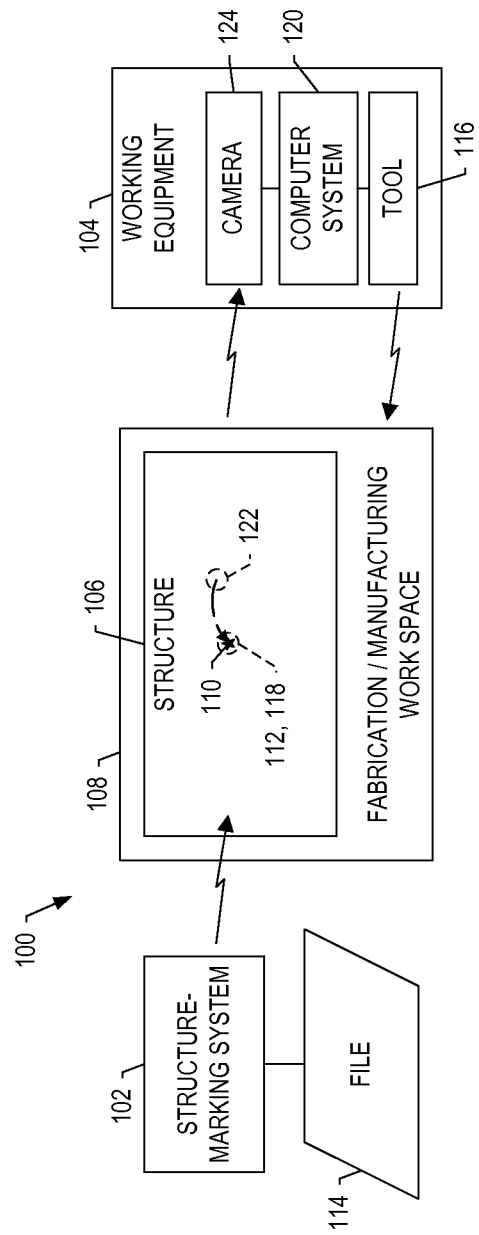
FIGS. 1 and 2 illustrate a system according to respective example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

FIG. 1 illustrates a system 100 according to one example implementation of the present disclosure. As shown, the system 100 may include a structure-marking system 102 and working equipment 104 that operate on one or more structures 106 (e.g., aircraft parts) in one or more work spaces, such as a fabrication or manufacturing work space 108. In some examples, the structure-marking system 102 and working equipment 104 may be separately packaged; or in other examples, the structure-marking system 102 and working equipment 104 may be co-located within an integrated package.

The structure-marking system 102 may be generally configured to apply one or more permanent markings 110 such as linear-measurement markings (e.g., similar to a ruler), fiducial markings or the like for accurate structure locating and/or orienting, with the marking(s) being applied to the structure 106 at respective one or more known locations 112. For the sake of simplicity, FIG. 1 illustrates application of one marking 110 at a respective location 112, although more markings may be applied. Further, the marking 110 may have any of a number of different geometries, such as a circle, polygon (e.g., triangle, rectangle, square, star) and the like.

In one example, the structure-marking system 102 is configured to determine the location 112 on the structure 106 at which to apply the marking 110 based on a file 114 including information that defines the structure 106 and specifies the location 112. Although termed a "file," it should be understood that this and any other file herein may be formatted in any of a number of different manners, such as in one or more electronic files, one or more databases or the like.

The working equipment 104 is generally configured to work the structure 106, and may include one or more tools 116 for working the structure 106 at one or more working locations 118 thereon (one shown for example). The structure 106 may have the marking 110 applied thereto at a known location 112 with a known relationship with the working location 118. In some examples, the working location 118 may be coincident with or determinable from the marked location 112. The working equipment 104 may include a computer system 120 configured to determine the location and orientation of the structure 106 to thereby determine its placement (defined by its location and orientation). The computer system 120 may then be configured to position the tool 116 into at least partial alignment with the working location 118 according to the structure's placement. In some instances, however, the positioned tool 116 may still be at least slightly misaligned with the working location 118. That is, the tool 116 may be aligned with another (second) location 122 offset from the working location 118.

In accordance with example implementations of the present disclosure, the working equipment 104 may include a camera 124 (e.g., digital camera, laser camera, infrared camera, thermal camera, depth-aware or range camera, stereo camera) configured to capture an image of at least a portion of the structure 106 and including the marking 110. The computer system 120 may be configured to direct the camera 124 to capture the image, which in some examples may also include the other location 122 with which the tool 116 is aligned. The computer system 120 may process the image to more-precisely locate the working location 118 on the structure 106. The computer system 120 may then reposition the tool 116 from the other location 122 and into greater alignment with the located working location 118. The computer system 120 may then control the repositioned tool 116 to work the structure 106 at the respective location 118.

The working equipment 104 may be configured to work the structure 106 in any of a number of different manners, with each instance of work to the structure generally including one or more fabrication or manufacturing operations. In some examples, the working equipment 104 may include an appropriate tool 116 for drilling a hole at the working location 118, installing a fastener in a hole at the respective location 118, and the like. In another example, the working equipment 104 may include an appropriate tool 116 for cutting through the structure 106 along a line that includes the working location 118. In yet another example, the working equipment 104 may include an appropriate tool 116 for routing out a portion of the structure 106 that includes the working location 118.

Figure 2:
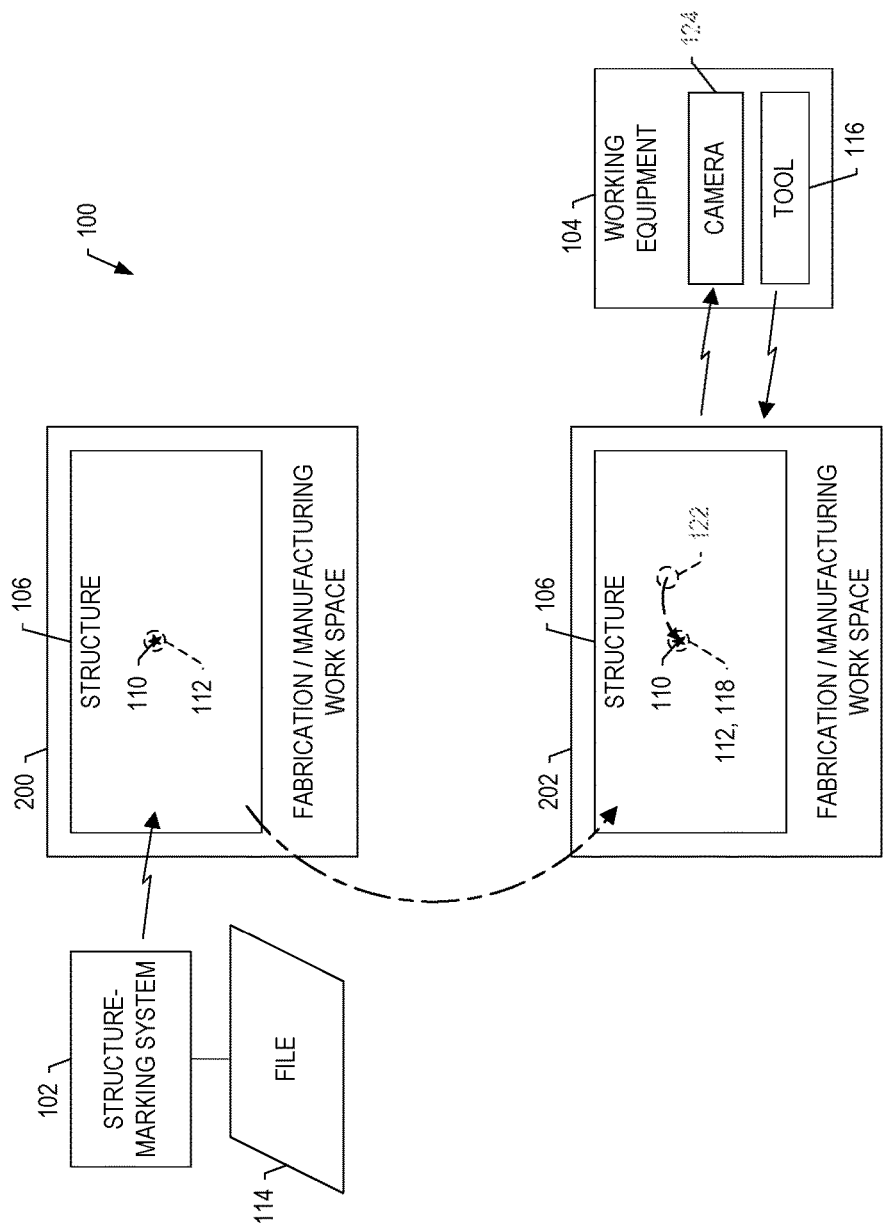

As shown in FIG. 1, the structure-marking system 102 and working equipment 104 may operate on the structure 106 in a common work space 108. FIG. 2 illustrates another example, however, in which each of the structure-marking system 102 and working equipment 104 may operate on the structure 106 in a respective work space 108. As shown in FIG. 2, in this other example, the structure-marking system 102 may be configured to apply the marking 110 to the structure 106 in a first work space 200 (e.g., fabrication work space). The structure 106 may thereafter be transported and placed at a second work space 202 where the working equipment 104 may be configured to position its tool 116 and work the structure 106.

Figure 3:
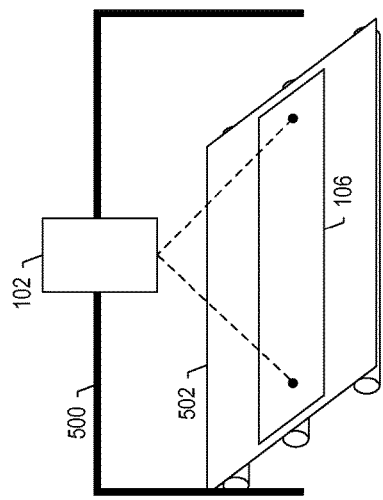
FIGS. 3-6 illustrate respective arrangements of a structure-marking system relative to a structure according to various example implementations.
Figure 4:
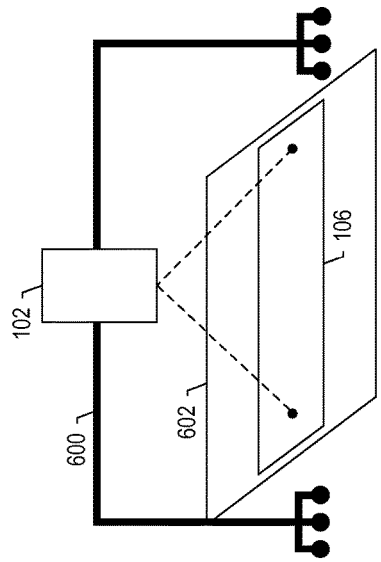
Figure 5:
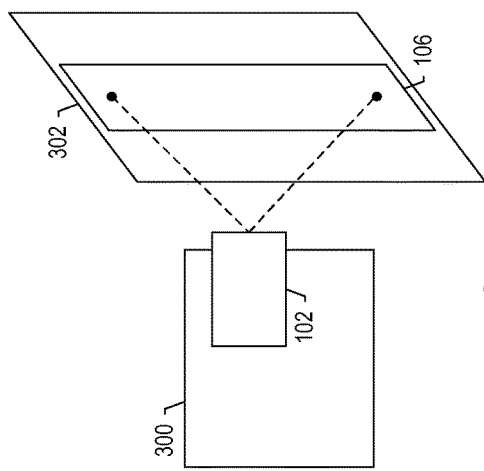
Figure 6:
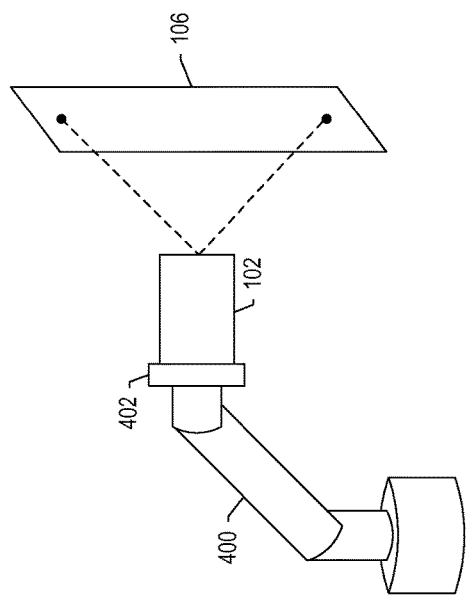

The structure-marking system 102 and structure 106 may be arranged in any of a number of different manners to carry out the marking application. As shown in FIG. 3, for example, the structure-marking system 102 may be equipped on a machine tool 300 configured to machine the structure 106 from raw material 302. Examples of suitable machine tools 300 include milling machines, lathes, drill presses and the like. In another example, as shown in FIG. 4, a robot may include a movable arm 400 with an end effector 402 (e.g., detachable end effector) on which the structure-marking system 102 may be equipped and moved relative to a machined structure 106. FIG. 5 illustrates another example in which the structure-marking system 102 may be equipped on a stationary overhead system 500 underneath which the structure 106 may be movable or otherwise carried by a movable support 502. Conversely, FIG. 6 illustrates an example in which the structure-marking system 102 may be equipped on a movable overhead system 600 that may be configured to move over the structure 106, which may be stationary or otherwise carried by a stationary support 602.

Figure 7:
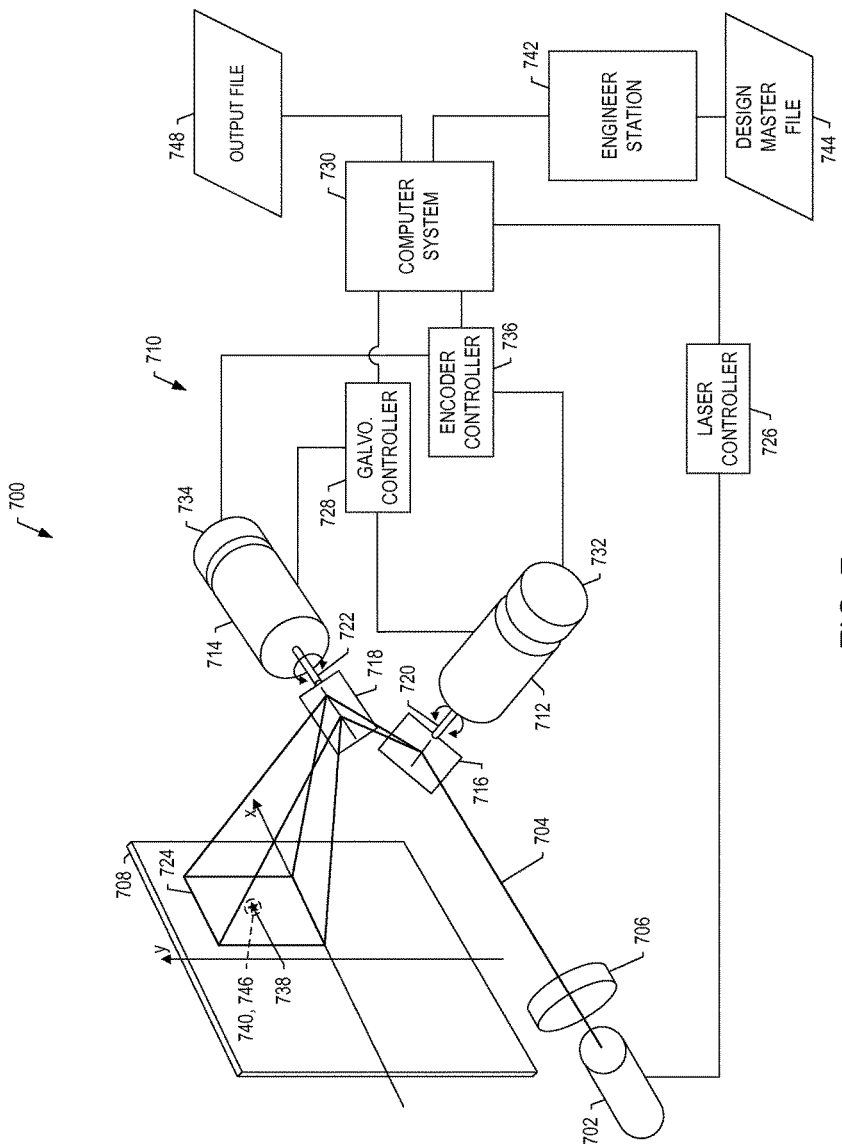
FIG. 7 illustrates a laser-marking system according to one example implementation.

The structure-marking system 102 may be configured to apply a marking 110 at a location 112 on the structure 106 in accordance with any of a number of different processes. Examples of suitable processes include laser marking, chemical etching, photo etching, inkjet printing, mechanical stamping, nameplates, casting/molding, pneumatic pin or dot-peen marker, vibratory pencil, $CO_2$ laser mask marking and the like. FIG. 7 illustrates a laser-marking system 700 according to one example implementation, and which may be one example of the structure-marking system 102 of the system 100 of FIG. 1. As shown, the laser-marking system 700 includes a laser source 702 configured to emit a laser beam 704 through a lens assembly 706 (e.g., objective lens) and onto a structure 708 (e.g., structure 106).

The laser-marking system may include a steering assembly 710 configured to steer the laser beam 704 onto the structure 708. As shown, for example, the steering assembly 710 may include first and second galvanometers 712, 714 coupled to respective first and second mirrors 716, 718, such as by respective first and second galvanometer shafts 720, 722 of the galvanometers 712, 714. The illustrated steering assembly 710 may be capable of steering the laser beam 704 in multiple directions (e.g., Cartesian x, y) within an envelope 724. In other examples, the steering assembly 710 may include only the first galvanometer 712 and mirror 716, or second galvanometer 714 and mirror 718, to steer the laser beam 704 in either the x or y direction. And in some examples, the lens assembly 706 may include a dynamic focus module (DFM) to further enable steering the laser beam 704 in the z direction.

The laser source 702 may be coupled to a laser controller 726 configured to manage its operation. Likewise, the steering assembly 710 may include one or more galvanometer controllers 728 coupled to the galvanometers 712, 714 and configured to manage their operation, separately or together. As shown, the laser-marking system 700 may also include a computer system 730 coupled to the controllers 726, 728. The computer system 730 may be configured to direct operation of the laser source 792 and galvanometers 712, 714 to steer the laser beam 704 from the laser source 702. In some examples, the laser-marking system 700 including each of its components may be arranged together relative to the structure 708 (e.g., FIGS. 3-6). In other examples, the computer system 730 may be arranged separate from the other components, and may be configured to communicate with the other components by wire or wirelessly.

In operation, the computer system 730 may transmit a control signal to the laser controller 726, which may receive the control signal and cause the laser source 792 to emit the laser beam 704 with one or more controllable parameters such as power, wavelength and the like. The laser beam 704 may be directed through the lens assembly 706 and onto the first mirror 716, reflect onto the second mirror 718, and impinge onto the structure 708. The computer system 730 may transmit one or more additional control signals to the galvanometer controller 728. The galvanometer controller 728 may receive the additional control signals and controllably position the galvanometers 712, 714 which may, in turn, controllably position respective mirrors 716, 718 to steer the laser beam 704. In one example, each galvanometer 712, 714 may be controlled to rotate to any position within an approximately 40° range. The laser beam 704 may thereby leave the second mirror 718 in a controlled vector direction over a desired range of angles in the x and y directions.

To enable the laser-marking system 700 to steer the laser beam 704 with increased precision, the first and second galvanometers 712, 714 may be coupled to respective first and second positional-feedback encoders 732, 734, such as absolute optical rotary encoders (transmissive or reflective). The encoders 732, 734 may be coupled to one or more encoder controllers 736 configured to manage their operation, separately or together. The positional-feedback encoders 732, 734 may be configured to measure angular position of the galvanometers 712, 714, or more specifically their respective shafts 720, 722, and transmit the angular-position measurements to the computer system 730 via the encoder controller 736. The computer system 730 may in turn be configured to determine the location of the laser beam 704 (e.g., Cartesian x, y coordinates) on the structure 708 based on the angular position measurements, and may steer the laser beam 704 to the known location 112 based on the determined location. In some examples, the laser-marking system 700 may include other optics (e.g., periscopes, prisms, etc.) that may facilitate directing the laser beam 704 onto the structure 704, which may enable both line-of-sight and out-of-sight positioning of the laser beam 704.

Figure 8:
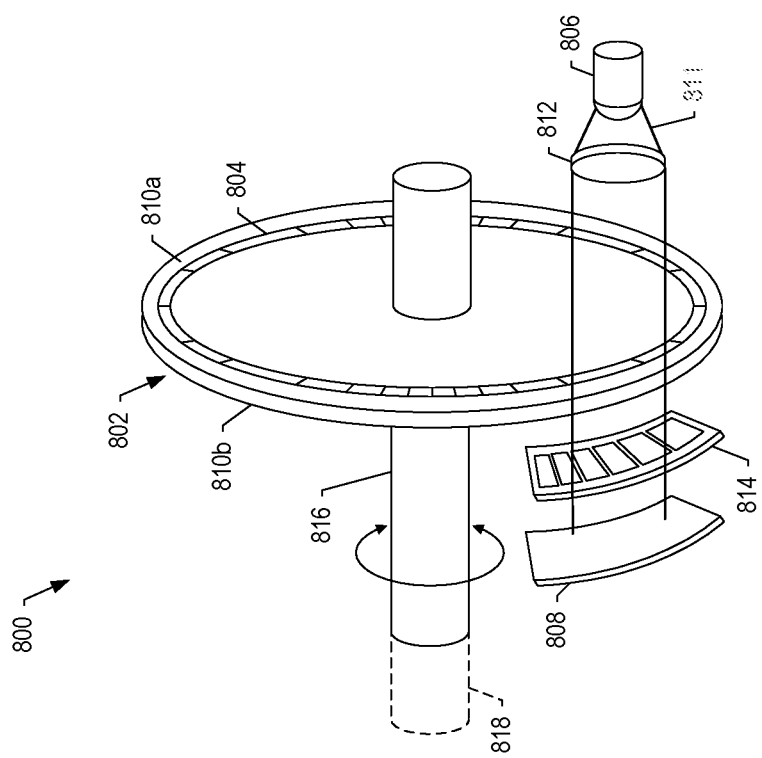
FIG. 8 illustrates a rotary encoder according to one example implementation.

FIG. 8 illustrates a transmissive optical rotary encoder 800 according to one example implementation, and which may be one example of a positional-feedback encoder 732, 734 of the laser-marking system 700 of FIG. 7. As shown, the rotary encoder 800 includes a circular, transparent and rotatable encoder plate 802 (sometimes referred to as a disc) that has one or more code patterns 804 disposed about its periphery. The rotary encoder 800 also includes a light source 806 (e.g., light-emitting diode) and photodetector 808 aligned with one another on respective opposing sides 810a, 810b of the encoder plate 802, both of which remain stationary in relation to rotation of the encoder plate 802. The light source 806 may be configured to emit a light beam 811 onto the encoder plate 802 directly or, as shown, through a condenser assembly 812. The light beam 811 may impinge on a part of the code pattern 804 aligned with the light source 806, and an amount of the light 811 may pass through the code pattern 804, and in turn the transparent encoder plate 802, based on the pattern's density. The amount of light 811 that passes through the encoder plate 802 may be detected by the photodetector 808 directly or, as shown, through a stationary mask 814. And the photodetector 808 may be configured to produce an electrical signal indicative of the magnitude of the amount of light that passed through the encoder plate 802.

As also shown, the encoder plate 802 may be mounted on a rotatable shaft 816, which may be in turn mounted to a galvanometer shaft 818 (e.g., shaft 720, 722). This may thereby provide rotation of the encoder plate 802 in concert with rotation of the galvanometer shaft 818 and its mirror (e.g., mirror 716, 718) coupled thereto. As the mirror changes position, the encoder plate 802 may rotate, thereby increasing or decreasing the intensity of the light beam detected by the photodetector 808. The code pattern 804 may be designed to indicate an absolute position of the encoder plate 802, and the shafts 816 and 818 may be coupled to one another with their respective encoder plate 802 and mirror in a known position relative to one another. The intensity of the detected light beam 814 may thereby provide an indication of the position of the encoder plate 804, which may in turn provide an indication of the position of the mirror coupled to the galvanometer shaft 818.

Returning to FIG. 7, the laser source 702 may include any of a number of different types of lasers capable of producing a laser beam 704, which is in turn capable of producing a marking 738 (e.g., marking 110) at location 740 (e.g., location 112) on the structure 708. Examples of suitable types of lasers include gas lasers (e.g., CO lasers, $CO_2$ lasers, excimer lasers), solid-state lasers (e.g., Nd:YAG lasers), semiconductor lasers, fiber lasers and the like. The laser-marking system 700 may be configured to mark the structure 708 according to any of a number of different laser-marking processes, which may be varied by controlling parameters (e.g., power, wavelength) of the laser beam 704 from the laser source 702. In some examples, suitable laser-marking processes may depend on the material of which the structure 708 is formed. Some examples of suitable materials include metals (e.g., stainless steel, aluminum, gold, silver, titanium, bronze, platinum, copper), plastics (e.g., ABS, polycarbonate, polyamide, PMMA, plastics with laser additives), coated metals, coated plastics, paints, wood, glass, fiber composites, foils, films, packaging, laminates and the like.

Examples of suitable laser marking processes include laser engraving, removing, staining, annealing and foaming. Laser engraving generally involves using the laser beam 704 to melt and evaporate the surface of the structure 708 to produce an impression in the surface. Removing generally involves using the laser beam 704 to remove one or more top coats applied to the surface of the structure 708, which may produce a contrast in instances in which the top coat and structure 708 have different colors. Staining generally involves the laser beam 704 generating a heat effect that causes a chemical reaction on the surface of the structure 708, which may result in discoloration of the surface. In accordance with various staining processes, the beam energy may be adjusted to change the surface properties of coating layer, although reflected energy may also be used for this purpose.

In an annealing process, the heat effect of the laser beam 704 may cause oxidation underneath the surface of the structure 708, which may result in discoloration of the surface. The foaming process generally uses the laser beam 704 to melt the structure 708 to produce gas bubbles on its surface. The gas bubbles may diffusely reflect light to produce an area lighter in color than other areas of the surface.

The computer system 730 may be configured to control parameters of the laser beam 704 from the laser source 702 to apply marking(s) 738 on the structure 708 according to a desired marking process. The computer system 730 may be also configured to control the galvanometers 712, 714 according to a scanning pattern that may define the location(s)) 740 on the structure 708 at which to apply the marking(s) 738. The computer system 730 may be manually or automatically operated to control the galvanometers 712, 713, and thereby apply the marking(s) 738.

In one example, the computer system 730 may be coupled to or configured to implement an engineer station 742, which may be arranged together with or separate from and in communication with (by wire or wirelessly) the laser-marking system 700. The engineer station 742 may be configured to execute appropriate software such as Unigraphics, CATIA or another CAD/CAM-type application to allow a user (e.g., design engineer) to create a design master file 744 relating to the structure 708. The design master file 744 may specify edge-of-structure information that relates to structure geometry (e.g., points, angles, lines) that defines the structure 708. In one example, the edge-of-structure information may include for each edge of the structure 708, a series of point objects connectable in a graph to form an image of the edge.

The design master file 744 may also include calibration point information from which placement of the structure 708 may be determined to enable accurate alignment of the laser beam 704 with the location 740 at which to apply the marking 738. As explained below, this information may also enable alignment of a tool (e.g., tool 116) for working the structure 708. In one example, calibration point information may provide the known locations of multiple targets on or proximate the structure 708. In various examples, these targets may include corners, edges or other features of the structure 708, which may be distinct from the marking 738.

The design master file 744 may also specify location information for marking and working the structure 708. The location information may identify one or more locations 740 at which to mark the structure 708. The location information may also identify one or more working locations 746 for working the structure, such as a location for drilling a hole, installing a fastener, cutting, routing and the like. In one example, the location information may be provided by absolute coordinates (e.g., Cartesian x, y, z), or coordinates or distances relative to one or more corners, edges or other features of the structure 708 to be marked and worked. As explained above the working location 746 may be coincident with or otherwise determinable from the marking 738 at its known location 740. Thus, in one example, the working location 746 may be provided by coordinates or distances relative to one or more markings 738.

Regardless of the exact content of the design master file 744, the engineer station 742, the computer system 730 or another facility coupled to either or both of the engineer station 742 or computer system 730 may process and/or reformat the design master file 744 to produce one or more laser marking output files 748 (e.g., file 114). The laser marking output file 748 may include edge-of-structure information, calibration point information, and location information for marking the structure 708, in a format understood by the computer system 730. In one example, the laser marking output file 748 may also include parameters of the laser beam 704 to carry out the desired marking process. In other examples, the computer system 730 may separately receive the parameters, or the laser source 702 may be more directly configured to produce the laser beam 704 with the parameters.

In some examples, the laser marking output file 748 may be transferred from the engineer station 742 or other facility to the computer system 730 (downloaded or uploaded). In other examples, the design master file 744 may be transferred from the engineer station 742 to the computer system 730 (downloaded or uploaded), with the computer system 730 itself producing the laser marking output file 748 (or causing the other facility to produce the laser marking output file 748). Once the computer system 730 has received (or produced) the laser marking output file 748, the computer system 730 may use the laser marking output file 742 for alignment and projection of the laser beam 704 on the structure 708 to apply the marking 738 at the location 740 thereon.

Figure 9:
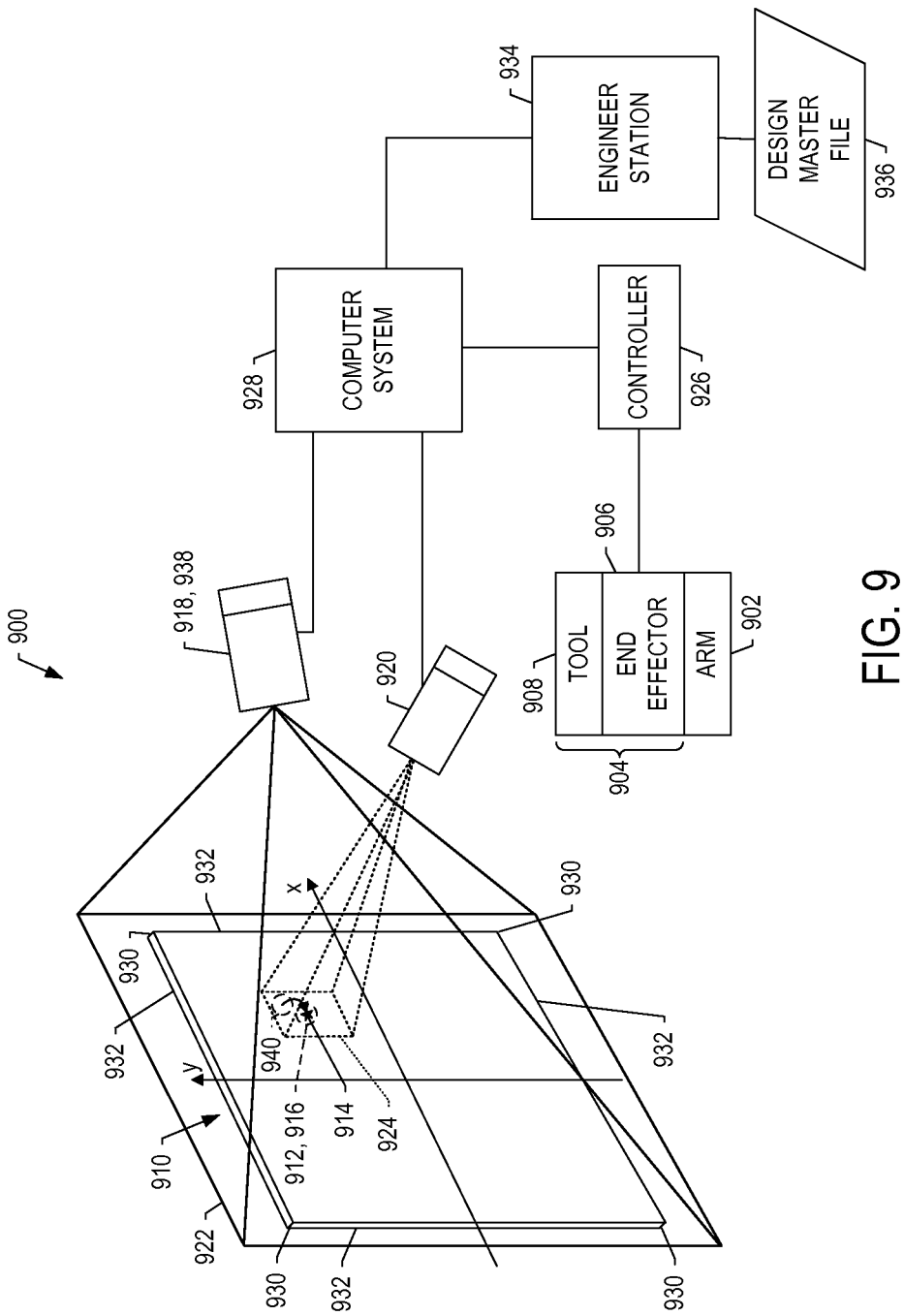
FIG. 9 illustrates working equipment according to one example implementation.

FIG. 9 illustrates working equipment 900 (electro-mechanical machine) according to one example implementation, and which may be one example of the working equipment 104 of the system 100 of FIG. 1. In one example, the working equipment 900 may be implemented a stationary or mobile robot. As shown, the working equipment 900 may include an arm 902 that has an end effector assembly 904. The end effector assembly 904 includes an end effector 906 and a tool 908 (e.g., tool 116) that may be integrated with or otherwise secured to the end effector 908. The end effector assembly 904 may be moveable (directly or via the arm 902) around one or more axes (x, y, z) to position the tool 908 relative to a structure 910 for working the structure 910 (e.g., structure 106, 708), which as explained above, may generally include one or more fabrication or manufacturing operations (e.g., drilling hole(s), installing fastener(s), cutting, routing).

The working equipment 900 may be configured to work the structure 910 at one or more working locations 912 (e.g., location 118, 746) thereon, which may be coincident with or otherwise determinable from one or more markings 914 (e.g., marking 110, 738) at respective one or more known locations 916 (e.g., location 112, 740). To enable the working equipment to position its tool 908 into alignment with the working location 912, the working equipment 900 may also include one or more cameras, such as one or more digital cameras, laser cameras, infrared cameras, thermal cameras, depth-aware or range cameras, stereo cameras or similar devices configured to capture electronic images. As shown, for example, the working equipment 900 may include first and second cameras 918, 920 configured to capture respective images within respective first and second fields of view 922, 924. In some examples, the first camera 918 may be in a fixed position relative to the working equipment 900, while the second camera 920 may be secured to the end effector assembly 904.

The arm 902, end effector 906 and/or tool 908 may be coupled to one or more controllers 926 configured to manage their operation. The working equipment 900 may also include a computer system 928 (e.g., computer system 120) coupled to the controller 926, as well as the cameras 918, 920. The computer system 928 may be configured to direct the cameras 918, 920 to capture and provide images of the structure 910. The computer system 928 may be configured to process the images to determine placement (location and orientation) of the structure 910 and locate the working location 912 at which to work the structure 910. The computer system 928 may also be configured to direct the controller 926 to position the tool 908 into alignment with the working location 912 based on the placement of the structure 910 and the working location 912. And the computer system 928 may direct controller 926 to in turn control the tool 908 to work the structure 910 at the location 912. The same or a similar positioning and working process may then repeat for any other working locations 912.

According to various more particular examples, the computer system 928 may transmit a control signal to the first camera 918, which may receive the control signal and capture a first image of the structure 910 covering the first field of view 922 within which one or more targets may be located. As suggested above, examples of suitable targets include corners 930, edges 932 or other features of the structure 910. The first camera 918 may transmit the first image to the computer system 928, which may process the first image to determine the placement of the structure 910.

In some examples, the computer system 928 may be coupled to or configured to implement an engineer station 934 the same as or similar to engineer station 742. Similar to engineer station 742, the engineer station 934 may be arranged together with or separate from and in communication with (by wire or wirelessly) the working equipment 900. Also similar to engineer station 742, the engineering station 934 may be used to create a master design file 936 the same as or similar to master design file 744. As explained above, the master design file 936 may specify edge-of-structure information that relates to structure geometry, and include calibration point information with the known locations of the targets 930, 932. In one example, then, the computer system 928 may process the first image using the master design file 936.

In one example, the working equipment 900 may include a laser scanner 938 (e.g., 3D scanner) in addition to or in lieu of the first camera 918. In this example, the laser scanner 926 may function similar to the first camera 918 to enable the computer system 928 to determine the placement of the structure 910. The laser scanner 938 may be configured to scan the structure 910 and provide measurements of points on the surface of the structure 910. The laser scanner 938 may transmit the measurements to the computer system 928, which may process the measurements generate a point cloud or other 3D model of the structure 910. The computer system 928 may then process the 3D model to determine the placement of the structure 910. And similar to before, in one example, the computer system 928 may process the measurements or 3D model using the master design file 936.

As also explained above, the master design file 936 may also specify location information that identifies the working location 912. In one example, the computer system 928 may transmit an additional control signal to the controller 926 to position the tool 908 based on the placement of the structure 910 and the working location 912. In this regard, the controller 926 may receive the control signal and controllably position the end effector assembly 904 to thereby controllably position the tool 908 into at least partial alignment with the location 912. In some instances, however, the positioned tool 908 may still be at least slightly misaligned with the working location 912. That is, the tool 908 may be aligned with another location 940 (e.g., location 122) offset from the working location 912.

According to example implementations, the second camera 920 (e.g., camera 124) may enable repositioning of the tool 908 to move its alignment with the other location 940 to the working location 912 (or closer thereto). In some examples, the computer system 928 may transmit a control signal to the second camera 920, which may receive the control signal and capture a second image of the structure 910 covering the second field of view 924 within which the marking 914 may be located, and which may also include the other location 940. The second image may thereby include the marking 914. In one example in which the second camera 920 may be secured to the end effector assembly 904, the second field of view 924 may be smaller than the first field of view 922. In this example, the tool 908 being positioned into even its misalignment with the working location 912 may also position the second camera 920 so that its field of view 924 encompasses the marking 914. The second camera 920 may transmit the second image to the computer system 928, which may process the second image to more precisely locate the working location 912 on the structure 910. In one example, the geometry of the marking 914 may indicate the manner of working the structure 910, and in this example, the computer system 928 may further process the second image to determine the respective manner of working the structure 910. In some examples, the location information of the master design file 936 may further identify the location 916 of the marking 914, in addition to the working location 912. In these examples, the computer system 928 may process the second image again using the master design file 936.

After locating the working location 912, the computer system 928 may transmit a further control signal to the controller 926 to reposition the tool 908 based on the located working location 912. Similar to before, the controller 926 may receive the control signal and controllably position the arm 902 and/or end effector assembly 904 to thereby controllably position the tool 908 into increased alignment with the location 912. In the same or yet other control signals, the computer system 928 may also direct the controller 926 to in turn control the tool 908 to work the structure 910 at the location 912. In some examples, the controller 926 may be directed to control the tool 908 to work the structure 910 according to the manner indicated by the geometry of the marking 914. The same or a similar positioning and working process may then repeat for any other working locations 912.

Figure 10:
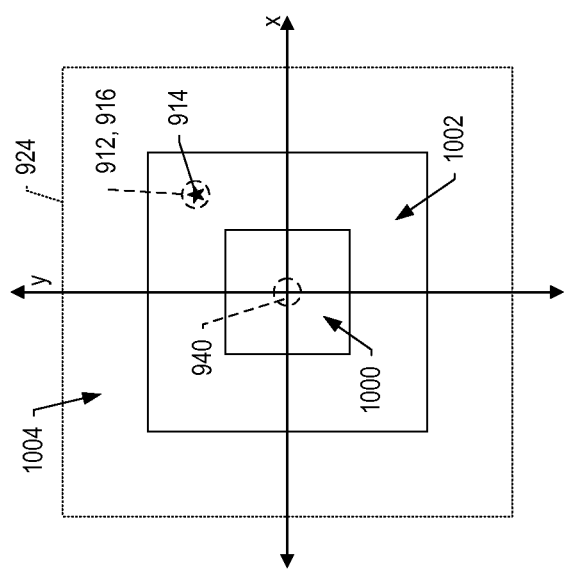
FIG. 10 illustrates a field of view of a camera according to one example implementation.

In some examples, the computer system 928 may be configured to reposition the tool 908 in instances in which the offset from its aligned location 940 to the working location 912 is greater than a predetermined threshold. FIG. 10 illustrates the field of view 924 of the second camera 920, and including the location 940 with which the tool 908 is aligned instead of the working location 912. The field of view 924 may be divided into a plurality of concentric zones of increasing size about the aligned location 940, including in one example a first zone 1000, a larger second zone 1002 located outside the first zone 1000, and an even larger third zone 1004 located outside the second zone 1002. The zones may be sized according to desirable thresholds for an acceptable offset or unacceptable offset of the aligned location 940 from the working location 912. For example, the first zone 1000 may define an acceptable offset, and the second and third zones 1002, 1004 may define an unacceptable offset.

In an instance in which the working location 912 is within the first zone 1000, the working equipment 900 may control the tool 908 to work the structure 910 without repositioning. The working equipment 900 may instead reposition the tool 908 before working the structure 910 in instances in which the working location 914 is within the second and/or third zones 1002, 1004. In one more particular example, the working equipment 900 may reposition the tool 908 in an instance in which the working location 912 is within the second zone 1002. In an instance in which the working location is within the third zone 1004, the working equipment 900 may produce a visual and/or audible error notification to an operator, in addition to or in lieu of repositioning the tool 908.

Figure 11:
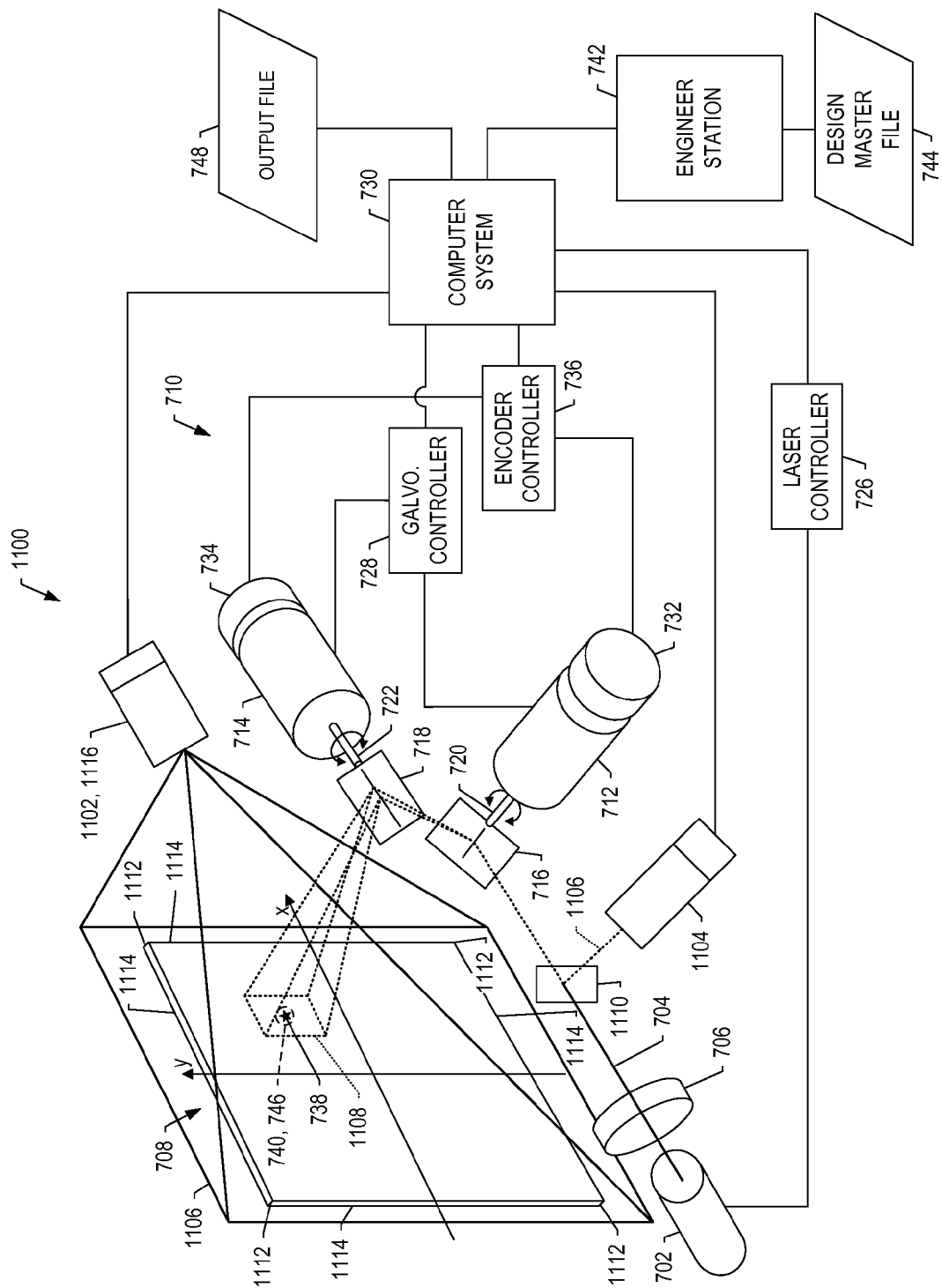
FIGS. 11-16 illustrate laser-marking systems according to other respective example implementations.

As shown and described with respect to FIG. 9, the working equipment 900 may include cameras 918 and 920 for placing the structure 910 and positioning/repositioning the tool 908 into alignment with the working location 912 of the structure 910. In some examples, the laser-marking system 700 may further include one or more cameras that may enable the laser-marking system 700 to similarly place the structure 708, and may further enable the laser-marking system 700 to inspect one or more marks 738 applied at respective one or more locations 740. FIG. 11 illustrates one example of a laser-marking system 1100 similar to that of FIG. 7 but further including first and second cameras 1102, 1104 coupled to the computer system 730 and configured to capture respective images within respective first and second fields of view 1106, 1108. In some examples, the first field of view 1104 may be fixed, while the second field of view 1106 may be steerable. In the illustrated example, the second camera 1104 may be positioned with its field of view 1108 directed to an optical filter 1110 in line with the laser beam 704. The optical filter 1110 may be configured to pass the laser beam 704, and reflect light to the second camera 1104. In this example, the second field of view 1108 may be steerable by the steering assembly 710 in a manner similar to the laser beam 704.

In a manner similar to that described above with respect to FIG. 9, the computer system 730 may be configured to direct the first camera 1102 to capture and provide a first image of the structure 708 including one or more targets such as corners 1112, edges 1114 or other features of the structure 708. Similar to the working equipment 900, in one example, the laser-marking system 1100 may include a laser scanner 1116 (e.g., 3D scanner) in addition to or in lieu of the first camera 1102. Similar to laser scanner 938, laser scanner 1116 may be configured to scan the structure 708 and provide measurements of points on the surface of the structure 708, from which the computer system 730 may generate a point cloud or other 3D model of the structure 708. The computer system 730 may process the first image or 3D model to determine placement (location and orientation) of the structure 708.

The computer system 730 may locate the location 740 at which to apply the marking 738 based on the structure's placement, and direct the steering assembly 710 to position the laser beam 704 into alignment with the respective location 740. And the computer system 730 may direct the laser controller 726 to in turn control the laser source 702 to produce the laser beam 704 to apply the marking 738 at the location 740. The same or a similar positioning and marking process may then repeat for any other markings 738.

As or after the laser-marking system 1100 applies a marking 738, the laser-marking system 1100 may use the second camera 1104 to inspect the applied marking 738, such as for its proper geometry, location and the like. In some examples, the marking 738 may be applied at another location (cf. location 940) offset from its desired location 740 (cf. working location 912). In a manner similar to that described above with respect to FIG. 9, then, the computer system 730 may be configured to direct the second camera 1004 to capture and provide a second image that may include the desired location 704, and the marking applied at the other location. The computer system 730 may be configured to process the second image to precisely locate the desired location 740 on the structure 708, and determine any offset of the marking 738 from the located desired location 740. In some examples, an offset within a predetermined threshold (e.g., within a first zone 1000) may be considered acceptable, while the computer system 730 may produce a visual and/or audible error notification to an operator in instances in which the offset is greater than the predetermined threshold (e.g., within second or third zones 1002, 1004).

Figure 12:
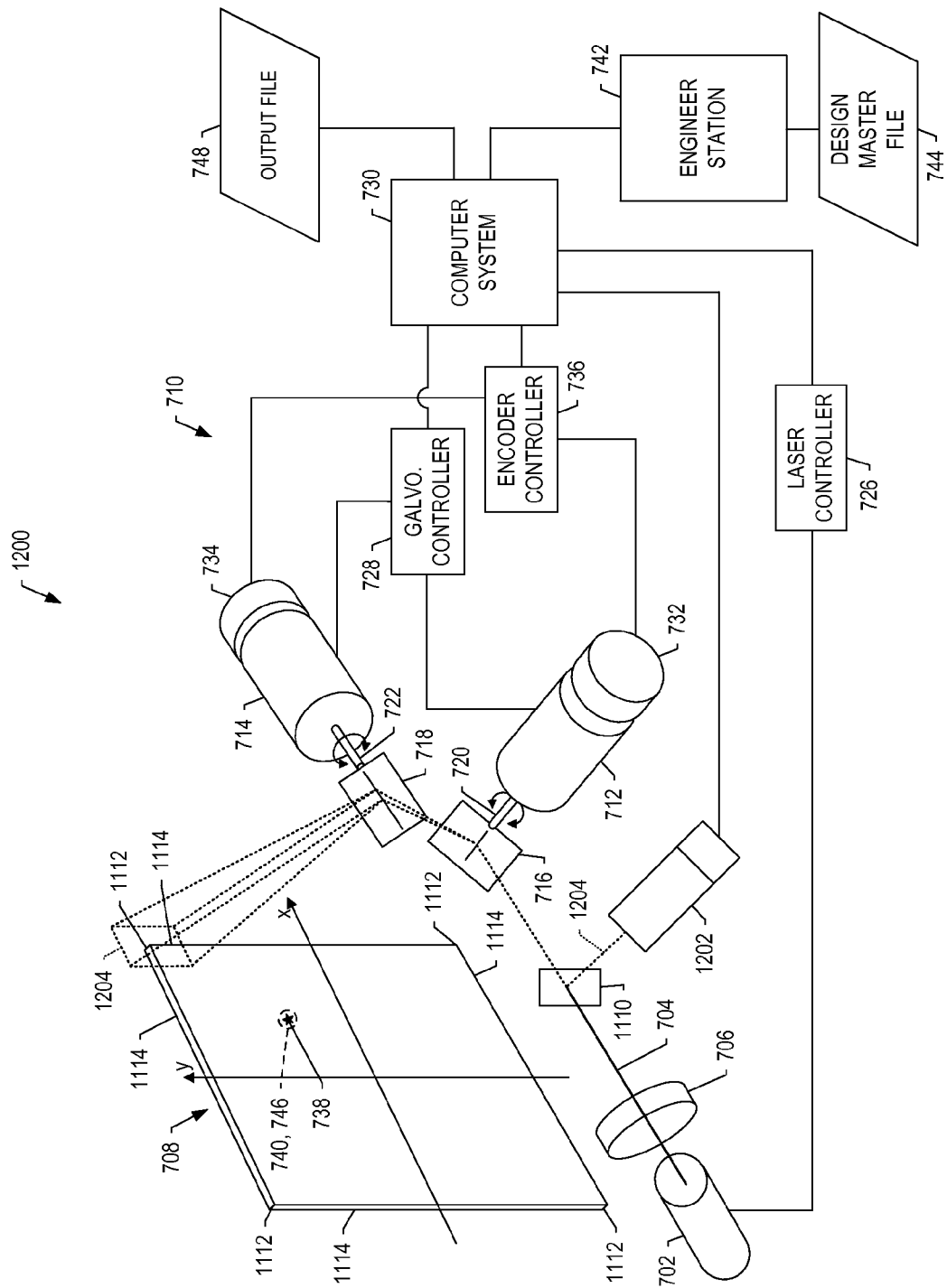

In other examples, a camera similar to the second camera 1104 may be used not only for inspecting an applied marking 738, but for placing the structure 708. FIG. 12 illustrates an example laser-marking system 1200 according to another example implementation. The laser-marking system 1200 of FIG. 12 is similar to the system 1100 of FIG. 11, but including a single camera 1202 with a steerable field of view 1204. In this example, the computer system 730 may direct the steering assembly 710 to steer the camera's field of view 1204 to one or more areas within which one or more targets may be located. Similar to above, examples of suitable targets include corners 1112, edges 1114 or other features of the structure 708. The computer system may direct the camera 1202 to capture an image of the structure 708 at each area, from which the computer system may place the structure 708, such as in a manner similar to that described above but with a first image. The same camera 1202 may then be used during or after markings 738 are applied to the structure.

Figure 13:
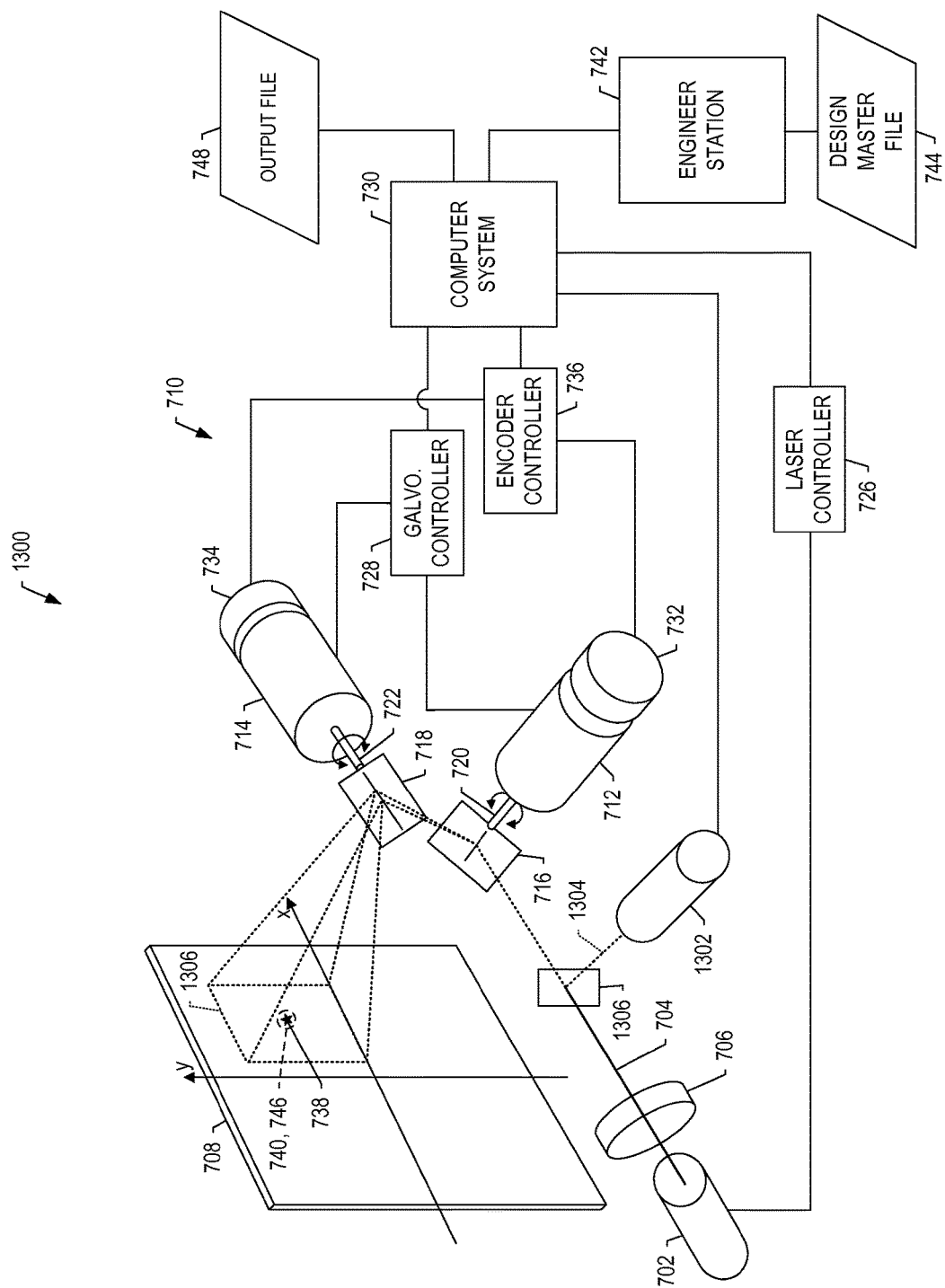

In some examples, the laser-marking system 700, 1109, 1200 may further project a temporary laser image at the location 740 on the structure 708 before application of the mark 738, which may facilitate a visual inspection of the placement of the marking 738 before its applied. FIG. 13 illustrates an example laser-marking system 1300 that may correspond to any of the aforementioned implementations of the laser-marking system 700, 1100, 1200—but shown without appropriate camera(s) 1102, 1104, 1202 or optical filter 1110. As shown, the laser-marking system 1300 may include a second laser source 1302 configured to project a laser image 1304 directed to an optical filter 1306 (the same or different from optical filter 1110) in line with the laser beam 704. This optical filter 1306 may be configured to pass the laser beam 704, and reflect laser image 1304. The laser image 1304 may be steerable by the steering assembly 710 in a manner similar to the laser beam 704. That is, the laser image 1304 may be steered by the steering assembly 710 in multiple directions within an envelope 1306, which may coincide with envelope 724. In this example, the laser image 1304 may be steered to location 740 before the laser beam 704, and may thereby provide a visual indication of the location 740 before the marking 738 is applied.

Figure 14:
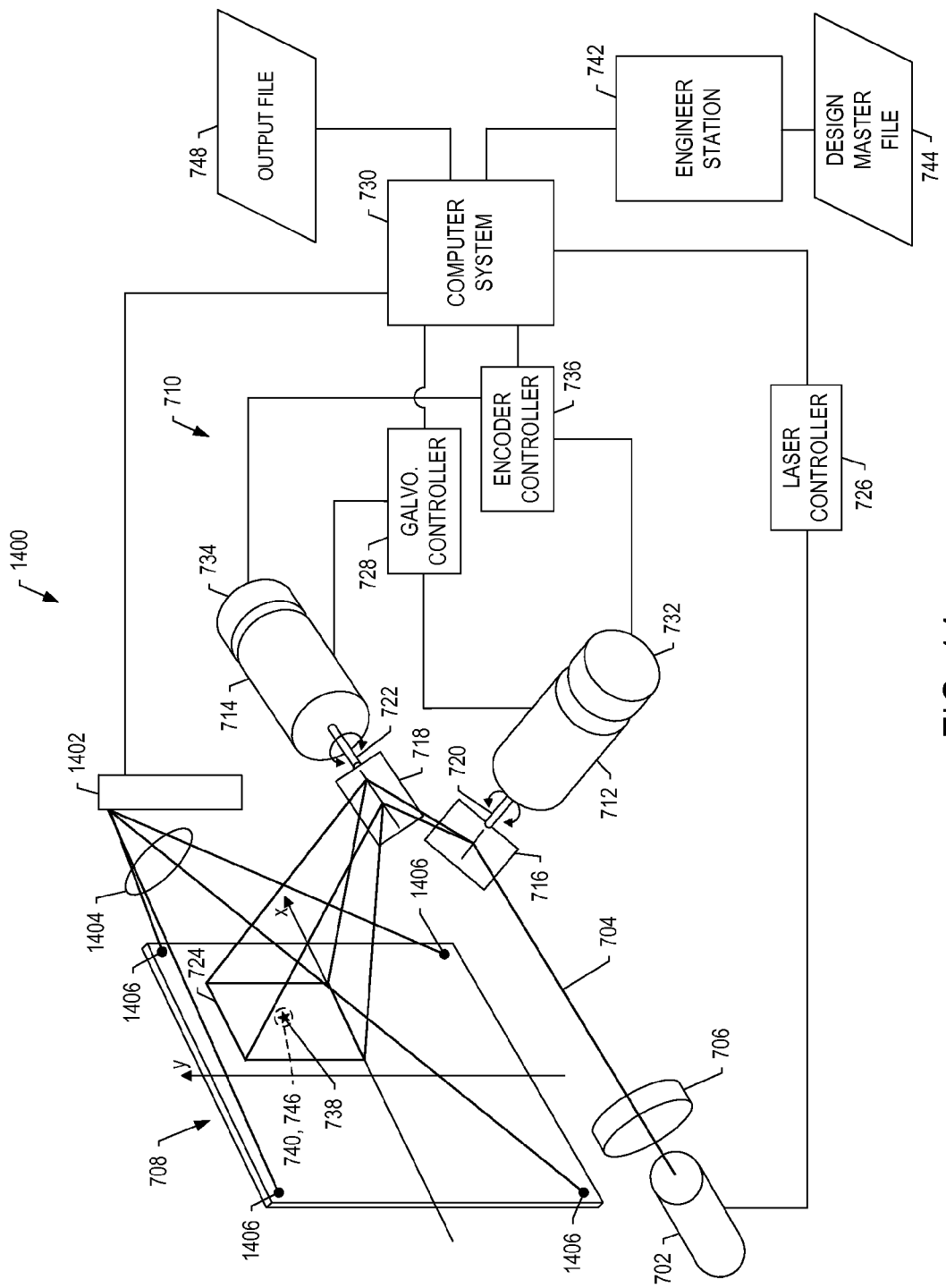

In some examples, the laser-marking system 700, 1100, 1200, 1300 may further include one or more metrology systems such as laser trackers, range sensors, vibration sensors and the like, which may further facilitate placement of the structure 708 and/or marking 738. FIG. 14 illustrates an example laser-marking system 1400 that may correspond to any of the aforementioned implementations of the laser-marking system 700, 1100, 1200, 1300—but shown without appropriate camera(s) 1102, 1104, 1202, optical filter 1110 or laser source 1302. As shown, the laser-marking system 1400 may include one or more laser trackers 1402 configured to project one or more steerable laser beams 1404 onto retro-reflective targets 1406 (distinct from markings 738) on or proximate the structure 708 at known locations. The targets 1406 may reflect the beam(s) back to the laser tracker(s) 1402, which may measure the reflected beam(s) and provide the measurements to the computer system 928. The computer system 928 may process the measurements from the laser tracker(s) 1402 to determine placement of the structure 708. Laser tracker(s) 1402 may provide very accurate measurements from which accurate placement of the structure 708 may be determined. Examples including laser tracker(s) 1402 may be particularly beneficial where highly-accurate marking is desirable such as on large and/or irregular structures 708.

Figure 15:
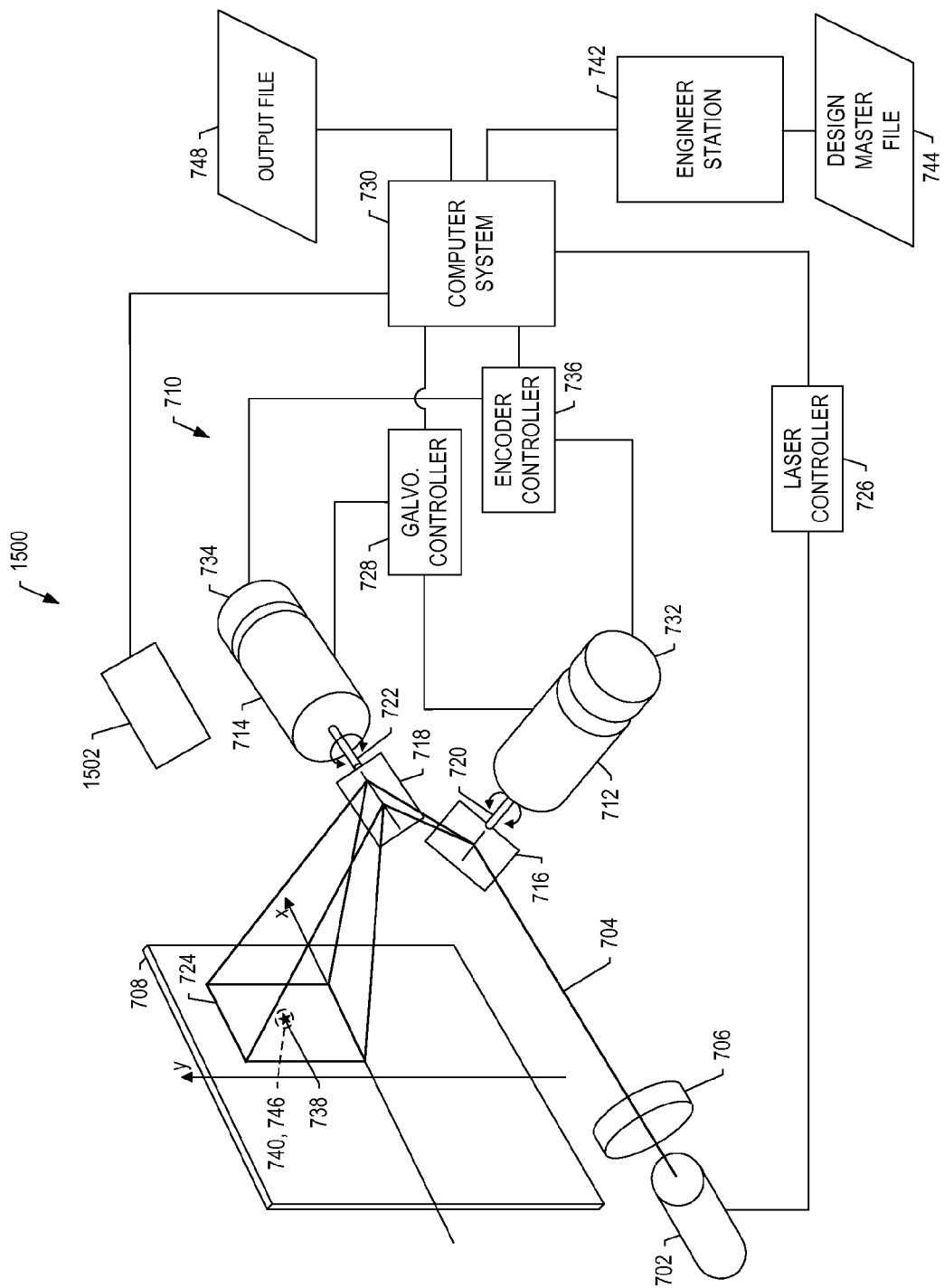

FIG. 15 illustrates an example laser-marking system 1500 that may correspond to any of the aforementioned implementations of the laser-marking system 700, 1100, 1200, 1300, 1400—but shown without appropriate camera(s) 1102, 1104, 1202, optical filter 1110, laser source 1302 or laser tracker 1404. As shown, the laser-marking system 1500 may include one or more range sensors 1502 configured to provide range measurements between the laser-marking system 1500 and the structure 708, or more particularly the between the range sensor(s) and the structure 708. Examples of suitable range sensors include laser rangefinders, LiDAR (Light Detection and Ranging) sensors, sonar sensors, camera or other visual sensors, or the like. For straight and flat structures, range sensor(s) 1502 may be useful to calculate an initial laser focus point or focal length for operation of the laser source 702. Range sensor(s) 1502 may also be useful to dynamically adjust the focal length as the laser-marking system 1500 applies markings 738 at various points on an uneven structure 708.

Figure 16:
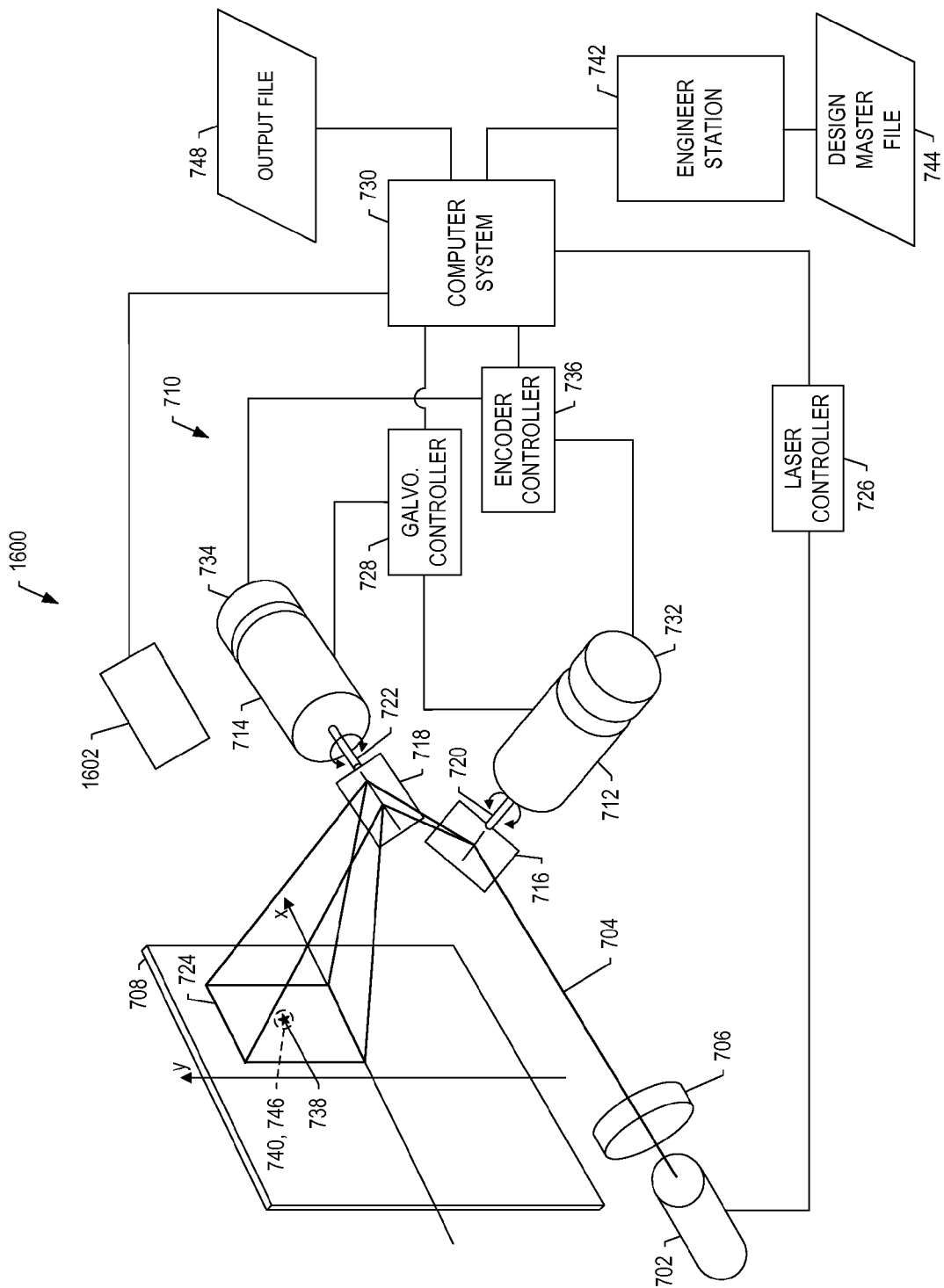

FIG. 16 illustrates an example laser-marking system 1600 that may correspond to any of the aforementioned implementations of the laser-marking system 700, 1100, 1200, 1300, 1400, 1500—but shown without appropriate camera(s) 1102, 1104, 1202, optical filter 1110, laser source 1302, laser tracker 1404 or range sensor 1502. As shown, the laser-marking system 1600 may include one or more vibration sensors 1602 configured to provide measurements of vibration of the structure 708, or the laser-marking system 1600 including the vibration sensor(s) 1602 disposed thereon. Examples of suitable vibration sensors include any of a number of different types of vibrometers, laser Doppler vibrometers (LDVs) or the like. Vibration sensor(s) 1602 may be useful to compensate for any vibrational movement of the structure 708 and/or laser-marking system 1600, which may facilitate accurate application of markings 738.

According to example implementations of the present disclosure, the system 100 including its structure-marking system 102 and working equipment 104 may be implemented by various means. Similarly, the examples of a laser-marking system 700, 1100, 1200, 1300, 1400, 1500, 1600 and working equipment 900 including each of their respective components, may be implemented by various means according to example implementations. Means for implementing the systems 100, 700, 1100, 1200, 1300, 1400, 1500, 1600 and working equipment 900 and their respective components may include hardware, alone or under direction of one or more computer program code instructions, program instructions or executable computer-readable program code instructions from a computer-readable storage medium.

In one example, one or more apparatuses may be provided that are configured to function as or otherwise implement one or more of the controllers 726, 728, 736, computer system 730 and/or engineer station 742 of the any of the example laser-marking systems 700, 1100, 1200, 1300, 1400, 1500, 1600. Similarly, one or more apparatuses may be provided that are configured to function as or otherwise implement one or more of the controller 926, computer system 928 and/or engineer station 934 of the example working equipment 900. In examples involving more than one apparatus, the respective apparatuses may be connected to or otherwise in communication with one another in a number of different manners, such as directly or indirectly via a wire or wirelessly.

Figure 17:
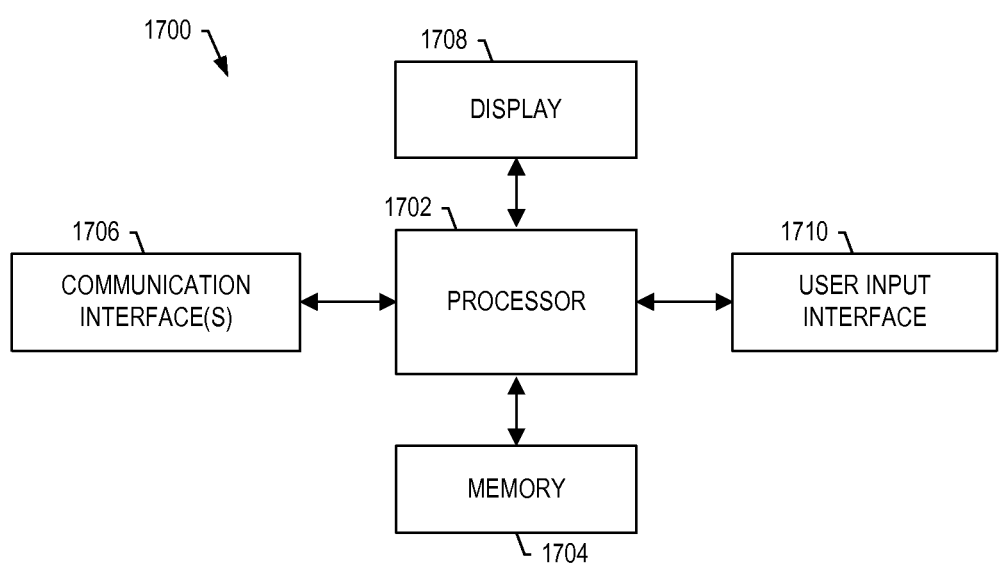
FIG. 17 illustrates an apparatus that may be configured to function as or otherwise implement one or systems, working equipment or components thereof, according to various example implementations.

Reference is now made to FIG. 17, which illustrates an example apparatus 1700 that may be configured to function as or otherwise implement one or more of the aforementioned components of the any of the example laser-marking systems 700, 1100, 1200, 1300, 1400, 1500, 1600, and/or one or more of the aforementioned components of the example working equipment 900. Generally, the apparatus 1700 of example implementations of the present disclosure may comprise, include or be embodied in one or more fixed or portable electronic devices. The apparatus 1700 may include one or more of each of a number of components such as, for example, a processor 1702 connected to a memory 1704.

The processor 1702 is generally any piece of computer hardware that is capable of processing information such as, for example, data, computer-readable program code, instructions or the like (generally "computer programs," e.g., software, firmware, etc.), and/or other suitable electronic information. The processor is composed of a collection of electronic circuits some of which may be packaged as an integrated circuit or multiple interconnected integrated circuits (an integrated circuit at times more commonly referred to as a "chip"). The processor 1702 may be configured to execute computer programs, which may be stored onboard the processor 1702 or otherwise stored in the memory 1704 (of the same or another apparatus 1700).

The processor 1702 may be a number of processors, a multi-processor core or some other type of processor, depending on the particular implementation. Further, the processor 1702 may be implemented using a number of heterogeneous processor apparatuses in which a main processor is present with one or more secondary processors on a single chip. As another illustrative example, the processor 1702 may be a symmetric multi-processor apparatus containing multiple processors of the same type. In yet another example, the processor 1702 may be embodied as or otherwise include one or more application-specific integrated circuits (ASICs), field-programmable gate arrays (FPGAs)

or the like. Thus, although the processor 1702 may be capable of executing a computer program to perform one or more functions, the processor 1702 of various examples may be capable of performing one or more functions without the aid of a computer program.

The memory 1704 is generally any piece of computer hardware that is capable of storing information such as, for example, data, computer programs and/or other suitable information either on a temporary basis and/or a permanent basis. In one example, the memory 1704 may be configured to store various information in one or more databases. The memory 1704 may include volatile and/or non-volatile memory, and may be fixed or removable. Examples of suitable memory 1704 include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory 1704 may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory 1704, the processor 1702 may also but need not be connected to one or more interfaces for displaying, transmitting and/or receiving information. The interfaces may include one or more communications interfaces 1706 and/or one or more user interfaces. The communications interface 1706 may be configured to transmit and/or receive information, such as to and/or from other apparatus(es), network(s) or the like. The communications interface 1706 may be configured to transmit and/or receive information by physical (by wire) and/or wireless communications links. Examples of suitable communication interfaces include a network interface controller (NIC), wireless NIC (WNIC) or the like.

The user interfaces may include a display 1708 and/or one or more user input interfaces 1710. The display 1708 may be configured to present or otherwise display information to a user, suitable examples of which include a liquid crystal display (LCD), light-emitting diode display (LED), plasma display panel (PDP) or the like. The user input interfaces 1710 may be by wire or wireless, and may be configured to receive information from a user into the apparatus 1700, such as for processing, storage and/or display. Suitable examples of user input interfaces 1710 include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the system, apparatuses and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Figure 18:
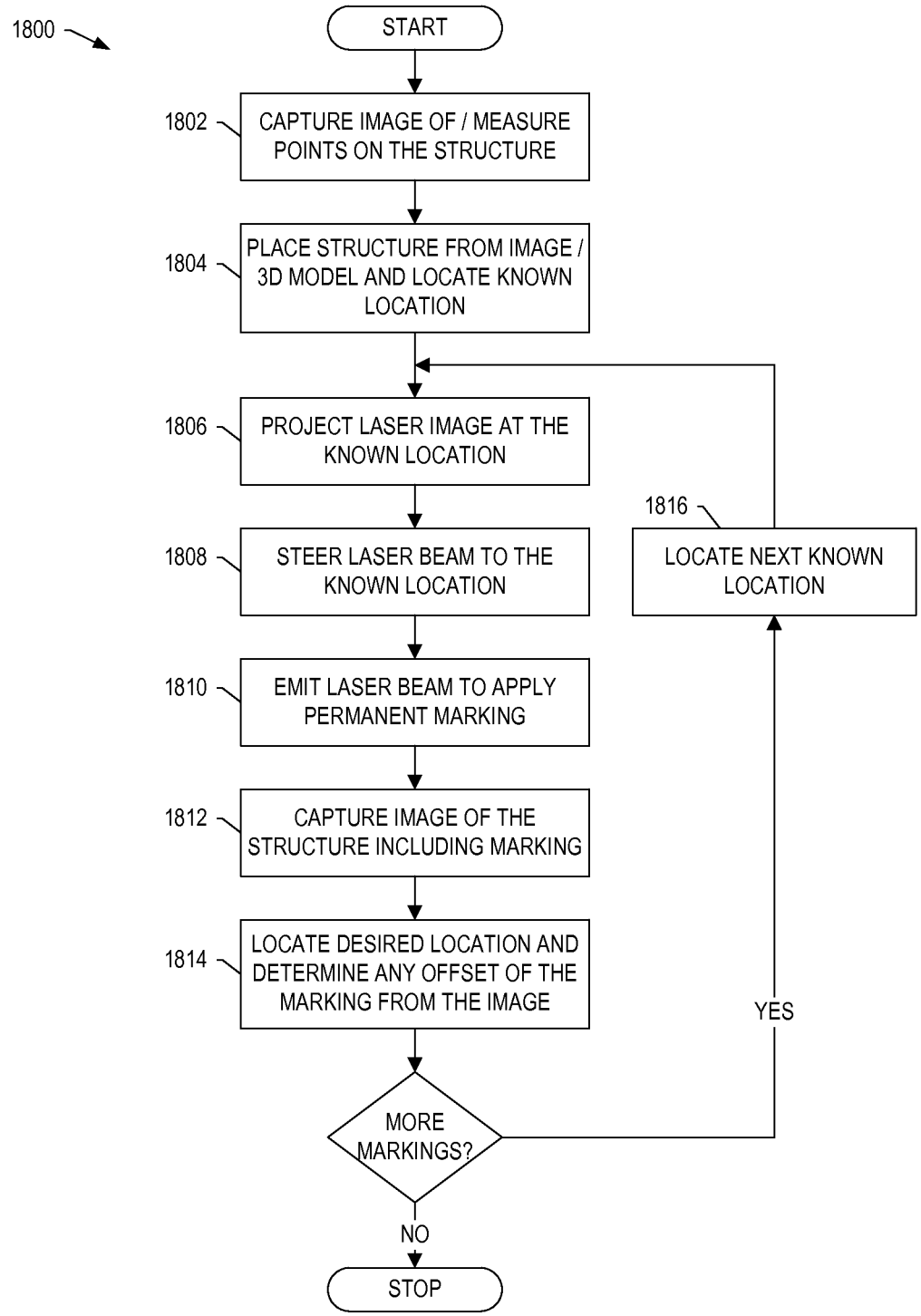
FIGS. 18 and 19 are flowcharts illustrating various steps in methods according to various example implementations.

FIG. 18 illustrates various steps in a method 1800 according to example implementations of the present disclosure. The method 1800 may include capturing an image of at least a portion of a structure 708 to be worked, and including one or more targets 1112, 1114 on or proximate the structure 708, as shown in block 1802. Or in another example, the method may include measuring points on a surface of the structure from which a 3D model of the structure is generatable. The method 1800 may also include processing the image or 3D model to determine placement of the structure 708, and locating a known location 740 at which to apply a permanent marking 738 based on the structure's placement, as shown in block 1804. In one example, the method 1800 may include projecting a laser image 1304 on the structure 708 at the location 740, as shown in block 1806.

The method 1800 may include directing operation of a steering assembly 710 to steer a laser beam 704 to the known location 740 on the structure 708 at which to apply the marking 738, as shown in block 1808. The respective location 740 may have a known relationship with a working location 746 at which to work the structure 708. The method 1800 may include directing operation of a laser source 702 to emit the laser beam 704 onto the structure 708, as shown in block 1810. The laser beam 704 may be emitted with one or more controllable parameters to apply the permanent marking 738 to the structure 708.

In one example, directing operation of the steering assembly 710 may include controllably rotating a galvanometer 712, 714 coupled to a mirror 716, 718 configured to reflect the laser beam 704, with the galvanometer 712, 714 and mirror 716, 718 being controllably rotated to steer the laser beam 704 in a particular direction (e.g, x, y). In this example, an angular position of the galvanometer 712, 714 may be measured by an optical rotary encoder 732, 734 coupled to the galvanometer 712, 714. And a location of the laser beam 704 on the structure 708 may be determined based on the measurement, and the laser beam 704 may be steered to the known location 740 based on the determined location.

In one example, the known location 740 is a desired location, and in at least one instance the marking 738 is offset from the desired location 740. In this example, the method 1800 may further include capturing an image of at least a portion of the structure 708 and including the desired location 740 and marking 738, as shown in block 1812. The image may be processed to locate the desired location 740, and the offset of the marking 738 from the located desired location 740 may be determined, as shown in block 1814. This may enable inspection of the marking 738 applied to the structure 708.

In a further example, the image may be captured by a camera 1202 having a field of view 1204 steerable by the steering assembly 710. In this example, the method 1800 may further include directing operation of the steering assembly 710 to steer the field of view 1204 to one or more areas within which one or more targets 1112, 1114 on or proximate the structure 708 are located. Also in this example, the method 1800 may include capturing for the one or more areas, one or more images of at least a portion of the structure 708 and including the target(s) 1112, 1114. The image(s) may then be processed to determine placement of the structure 708, and the known location 740 at which to apply the marking 738 may be located based on the structure's placement.

This process may then repeat to apply the marking 738 at any other desirable locations 740, as shown in block 1816.

Figure 19:
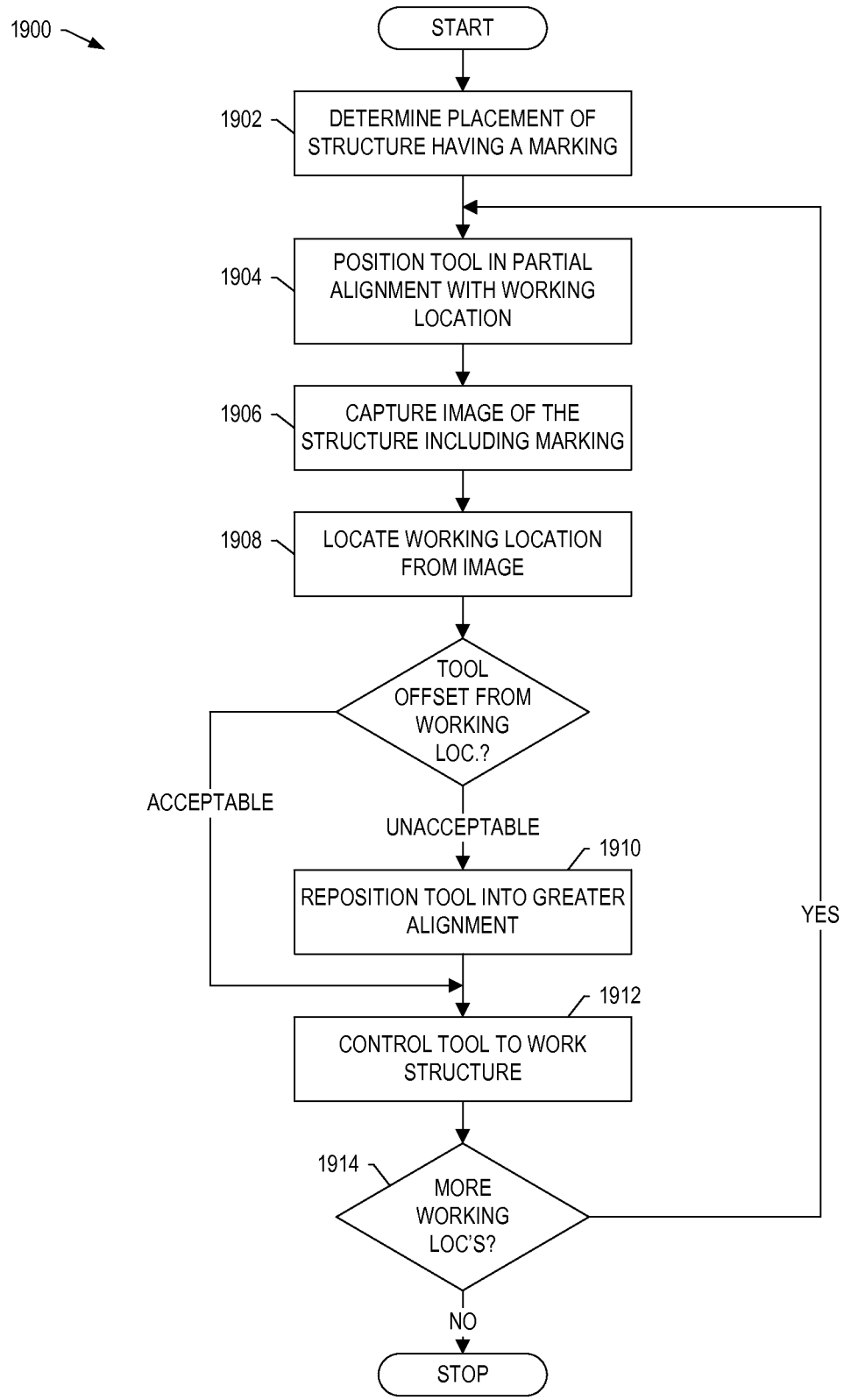

FIG. 19 illustrates various steps in a method 1900 according to other example implementations of the present disclosure. The method 1900 may include determining placement of a structure 910 having a marking 914 applied thereto at a known location 916 with a known relationship with a working location 912 thereon, as shown in block 1902. The method 1900 may include positioning a tool 908 into at least partial alignment with the working location 912 according to the structure's placement, as shown in block 1904. In at least one instance, however, the tool 908 may be aligned with another location 940 offset from the working location 912. The method 1900 may also include capturing an image of at least a portion of the structure 910 and including the marking 914, and further including the other location 940 with which the tool 908 is aligned, as shown in block 1906.

In one example, the image is a second image captured by a second camera 920. In this example, determining the structure's placement may include capturing by a first camera 918, a first image of at least a portion of the structure 910 and including one or more targets 930, 932 on or proximate the structure 910. The first image may then be processed to thereby determine the structure's placement.

In one example, a movable end effector assembly 904 may include an end effector 906 and the tool 908, the image may be captured by a camera 920 secured to the end effector assembly 904. In this example, positioning the tool 908 may include positioning the end effector assembly 904 and thereby the tool 908, with the camera 920 also being thereby positioned such that a field of view 924 of the camera 920 encompasses the marking 914.

The method 1900 may further include processing the (second) image to locate the working location 912, as shown in block 1908. The method may then at times include repositioning the tool 908 from the other location 940 and into greater alignment with the located working location 912, and controlling the repositioned tool 908 to work the structure 910 at the located working location 912. In one example in which the image is captured by a camera 920, its field of view 924 may be divided into a plurality of concentric zones of increasing size about the other location 940 with which the tool 908 is aligned. The zones may include a first zone 1000 that defines an acceptable offset, and a larger second zone 1002 located outside the first zone 1000 that defines an unacceptable offset. Repositioning the tool 908 and controlling the repositioned tool 908 to work the structure 910, then, may include repositioning the tool 908 before controlling the tool 908 to work the structure 910 in an instance in which the located working location is within the second zone, as shown in blocks 1910 and 1912. Or controlling the tool 908 to work the structure 910 without repositioning in an instance in which the located working location 912 is within the first zone 1000, as in block 1912.

This process may then repeat to work other working locations 912 on the structure 910, such as using the same or other images including the same or other markings 914, as shown in block 1914.

Figure 20:
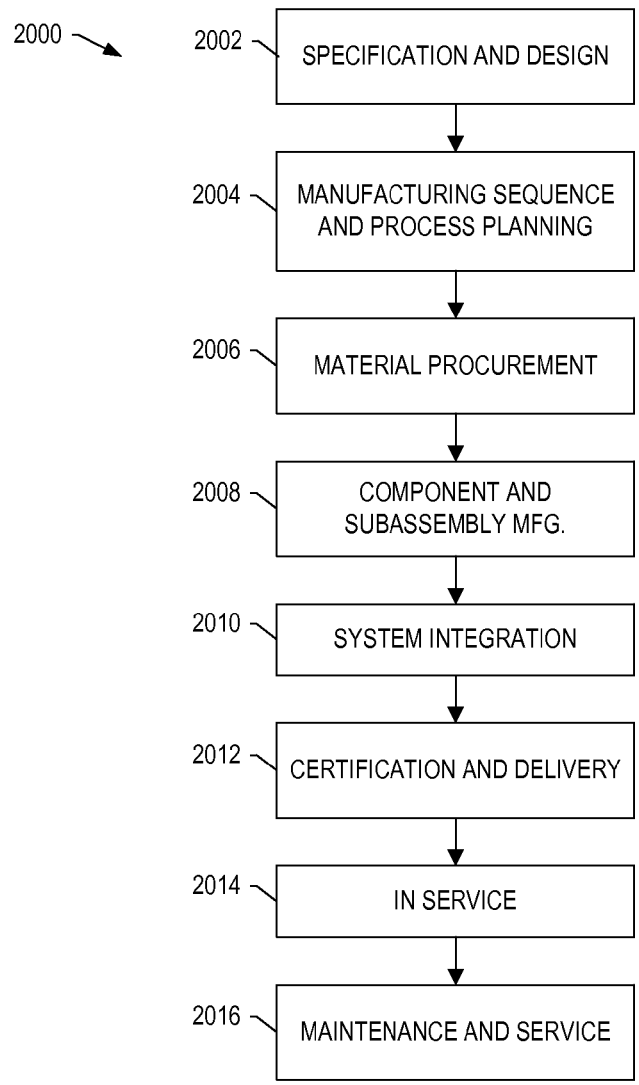
FIG. 20 is an illustration of a flow diagram of aircraft production and service methodology according to one example implementation.
Figure 21:
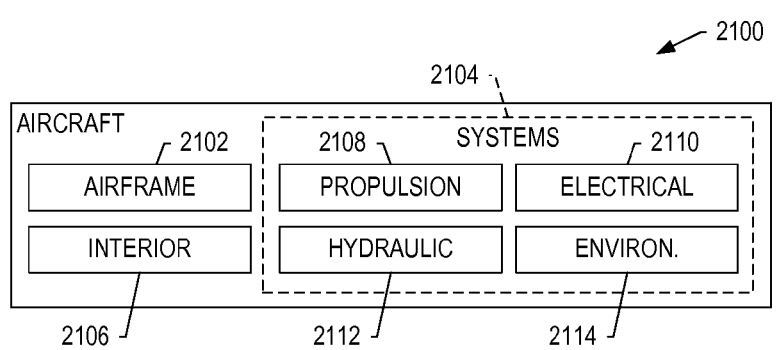
FIG. 21 is an illustration of a block diagram of an aircraft according to one example implementation.

Implementations of the disclosure may find use in a variety of potential applications, particularly in the transportation industry, including for example, aerospace, marine and automotive applications. Thus, referring now to FIGS. 20 and 21, example implementations may be used in the context of an aircraft manufacturing and service method 2000 as shown in FIG. 20, and an aircraft 2100 as shown in FIG. 21. During pre-production, the example method may include specification and design 2002 of the aircraft 2100, manufacturing sequence and processing planning 2004 and material procurement 2006. The disclosed method may be specified for use, for example, during material procurement 2006.

During production of the aircraft 2100, component and subassembly manufacturing 2008 and system integration 2010 takes place. The disclosed system and method may be used to mark structures and/or work marked structures of the aircraft 2100 either or both of the component and subassembly manufacturing process 2008 or system integration 2010. Thereafter, the aircraft 2100 may go through certification and delivery 2012 in order to be placed in service 2014. While in service 2014 by a customer, the aircraft 2100 may be scheduled for routine maintenance and service 2016 (which may also include modification, reconfiguration, refurbishment or the like). Structures of the aircraft 2100 may be marked and/or worked according to the disclosed method while in service 2014, and in one example, during the maintenance and service 2016.

Each of the processes of the example method 2000 may be performed or carried out by a system integrator, third party and/or operator (e.g., customer). For the purposes of this description, a system integrator may include for example any number of aircraft manufacturers and major-system subcontractors; a third party may include for example any number of vendors, subcontractors and suppliers; and an operator may include for example an airline, leasing company, military entity, service organization or the like.

As shown in FIG. 21, an example aircraft 2100 produced by the example method 2000 may include an airframe 2102 with a plurality of systems 2104 and an interior 2106. Structures marked and/or worked according to the disclosed method and system may be used in the airframe 2102 and within the interior. Examples of high-level systems 2104 include one or more of a propulsion system 2108, electrical system 2110, hydraulic system 2112, environmental system 2114 or the like. Any number of other systems 2104 may be included. Although an aerospace example is shown, the principles of the disclosure may be applied to other industries, such as the marine and automotive industries.

Systems, apparatuses and methods embodied herein may be employed during any one or more of the stages of the example production and service method 2000. For example, components or subassemblies corresponding to production process 2008 may be marked and/or worked according to the disclosed method while the aircraft 2100 is in service 2014. Also, one or more example system implementations, apparatus implementations, method implementations or a combination thereof may be utilized to mark structures and/or work marked structures during the production stages 2008 and 2010, which may substantially expedite assembly of or reduce the cost of an aircraft 2100. Similarly, one or more of system implementations, apparatus implementations, method implementations or a combination thereof may be utilized while the aircraft 2100 is in service 2014, for example.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A laser-marking system comprising:
    a laser source configured to emit a laser beam having one or more controllable parameters;
    a steering assembly configured to steer the laser beam onto a structure to be worked, wherein the steering assembly comprises:
        a galvanometer coupled to a mirror configured to reflect the laser beam, the galvanometer and mirror being controllably rotatable to steer the laser beam in a particular direction; and
        a transmissive optical rotary encoder coupled to a computer system and the galvanometer, and configured to measure an angular position of the galvanometer; and
    the computer system coupled to the laser source and steering assembly, and configured to:
        direct operation of the steering assembly to steer the laser beam onto a known location on the structure, the known location having a known relationship with a working location for at least one tool to work the structure, the computer system being configured to determine an initial, linear location of the laser beam on the structure based on the measured angular position, and steer the laser beam to the known location based on the determined initial, linear location; and
        direct operation of the laser source to emit the laser beam and control the one or more controllable parameters to cause the laser beam to apply a permanent marking to the structure at the known location, the permanent marking operably configured for use in positioning the at least one tool to work the structure at the working location.

2. The laser-marking system of claim 1 further comprising:
    a camera or a laser scanner coupled to the computer system, wherein:
    the camera is configured to capture an image of at least a portion of the structure and including one or more targets on or proximate the structure; and
    the laser scanner is configured to measure points on a surface of the structure from which a 3D model of the structure is generatable,
    wherein the computer system is configured to process the image or the 3D model to determine a placement of the structure, and locate the known location at which to apply the permanent marking based on the placement.

3. The laser-marking system of claim 1, wherein the known location is a desired location, and in at least one instance the permanent marking is offset from the desired location, and wherein the laser-marking system further comprises:
    a camera coupled to the computer system and configured to capture an image of at least a portion of the structure and including the desired location and the permanent marking,
    wherein the computer system is configured to process the image to locate the desired location, and determine an offset of the permanent marking from the located desired location.

4. The laser-marking system of claim 3, wherein the camera has a field of view steerable by the steering assembly, the computer system being configured to direct operation of the steering assembly to steer the field of view to one or more areas within which one or more targets on or proximate the structure are located,
    wherein for the one or more areas, the camera is configured to capture one or more images of at least a portion of the structure and including the one or more targets, and
    wherein the computer system is configured to process the one or more images to determine a placement of the structure, and locate the known location at which to apply the permanent marking based on the placement.

5. The laser-marking system of claim 1 further comprising:
    a second laser source configured to project a laser image on the structure at the location before the laser beam is emitted to apply the permanent marking to the structure at the known location.

6. The laser-marking system of claim 1 further comprising:
    a laser tracker configured to project one or more steerable laser beams onto retro-reflective targets and provide measurements of one or more beams reflected from the targets for determination of a placement of the structure, wherein each one of the retro-reflective targets is on or proximate the structure at a respective known target location.

7. The laser-marking system of claim 1 further comprising:
    a range sensor configured to provide range measurements between the laser-marking system and the structure for calculation of an initial focus point or focal length for operation of the laser source, or dynamic adjustment of the focal length.

8. The laser-marking system of claim 1 further comprising:
a vibration sensor configured to provide measurements of vibration of the structure, or the laser-marking system including the vibration sensor disposed thereon, for compensation of vibrational movement of the structure or laser-marking system.

9. The laser-marking system of claim 1, wherein the known location has the known relationship with the working location for the at least one tool to drill a hole, install a fastener, cut the structure or route out a portion of the structure, and thereby work the structure after application of the permanent marking.

10. The laser-marking system of claim 1, wherein:
the at least one tool is a component of working equipment; and
the known location has the known relationship with the working location specified by a master design file for the structure, the master design file being configured for use by the working equipment to position the at least one tool to work the structure at the working location, the at least one tool being separate and distinct from the laser source and steering assembly.

11. The laser-marking system of claim 1 further comprising:
a second galvanometer coupled to a second mirror configured to reflect the laser beam, the mirror being configured to reflect the laser beam onto the second mirror, and the second mirror being configured to reflect the laser beam onto the structure to be worked, the second galvanometer and second mirror being controllably rotatable to steer the laser beam in a second particular direction; and
a second optical rotary encoder coupled to the computer system and second galvanometer, and configured to measure an angular position of the second galvanometer,
wherein the computer system being configured to determine the initial, linear location of the laser beam includes being configured to determine the initial, linear location further based on the measured angular position of the second galvanometer.

12. A method comprising:
directing operation of a laser source to emit a laser beam onto a structure to be worked, the laser beam having one or more controllable parameters;
directing operation of a steering assembly to steer the laser beam to a known location on the structure, the known location having a known relationship with a working location for at least one tool to work the structure, wherein directing operation of the steering assembly comprises:
controllably rotating a galvanometer coupled to a mirror configured to reflect the laser beam, the galvanometer and mirror being controllably rotated to steer the laser beam in a particular direction;
measuring an angular position of the galvanometer by a transmissive optical rotary encoder coupled to the galvanometer; and
determining an initial, linear location of the laser beam on the structure based on the measured angular position, and steering the laser beam to the known location based on the determined initial, linear location; and
controlling the one or more parameters to cause the laser beam to apply a permanent marking to the structure at the known location, the permanent marking operably configured for use in positioning the at least one tool to work the structure at the working location.

13. The method of claim 12 further comprising:
capturing an image of at least a portion of the structure and including one or more targets on or proximate the structure, or measuring points on a surface of the structure from which a 3D model of the structure is generatable; and
processing the image or the 3D model to determine a placement of the structure, and locating the known location at which to apply the permanent marking based on the placement.

14. The method of claim 12, wherein the known location is a desired location, and in at least one instance the permanent marking is offset from the desired location, and wherein the method further comprises:
capturing an image of at least a portion of the structure and including the desired location and the permanent marking; and
processing the image to locate the desired location, and determining an offset of the permanent marking from the located desired location.

15. The method of claim 14, wherein the image is captured by a camera having a field of view steerable by the steering assembly, and the method further comprises:
directing operation of the steering assembly to steer the field of view to one or more areas within which one or more targets on or proximate the structure are located;
capturing for the one or more areas, one or more images of at least a portion of the structure and including the one or more targets; and
processing the one or more images to determine a placement of the structure, and locating the known location at which to apply the permanent marking based on the placement.

16. The method of claim 12 further comprising:
projecting a laser image on the structure at the known location before the laser beam is emitted to apply the permanent marking to the structure at the known location.

17. The method of claim 12 further comprising:
projecting one or more steerable laser beams onto retro-reflective targets, each one of the retro-reflective targets on or proximate the structure at a respective known target location, and
providing measurements of one or more beams reflected from the targets for determination of a placement of the structure.

18. The method of claim 12, wherein the laser source and steering assembly are components of a laser-marking system, and wherein the method further comprises:
providing range measurements between the laser-marking system and structure for calculation of an initial focus point or focal length for operation of the laser source, or dynamic adjustment of the focal length.

19. The method of claim 12, wherein the laser source and steering assembly are components of a laser-marking system, and wherein the method further comprises:
providing, by a vibration sensor, measurements of vibration of the structure, or the laser-marking system including the vibration sensor disposed thereon, for compensation of vibrational movement of the structure or laser-marking system.

20. The method of claim 12, wherein directing operation of the steering assembly further comprises:
- controllably rotating a second galvanometer coupled to a second mirror configured to reflect the laser beam, the mirror reflecting the laser beam onto the second mirror, and the second mirror reflecting the laser beam onto the structure to be worked, the second galvanometer and second mirror being controllably rotated to steer the laser beam in a second particular direction; and
- measuring an angular position of the second galvanometer by a second optical rotary encoder coupled to the second galvanometer,
- wherein determining the initial, linear location of the laser beam includes determining the initial, linear location further based on the measured angular position of the second galvanometer.

* * * * *